United States Patent
Shiga

(12)
(10) Patent No.: US 6,496,196 B2
(45) Date of Patent: Dec. 17, 2002

(54) INFORMATION RECORDING AND REPLAYING APPARATUS AND METHOD OF CONTROLLING SAME

(75) Inventor: Tomohisa Shiga, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/221,380

(22) Filed: Dec. 28, 1998

(65) Prior Publication Data

US 2002/0084999 A1 Jul. 4, 2002

(30) Foreign Application Priority Data

Jan. 6, 1998 (JP) .......................................... 10-001049

(51) Int. Cl.[7] ................................................ G09G 5/00
(52) U.S. Cl. ...................................... 345/629; 345/473
(58) Field of Search ................................. 345/473, 474, 345/475, 435, 508, 629, 714, 716, 723

(56) References Cited

U.S. PATENT DOCUMENTS

| | | | | | |
|---|---|---|---|---|---|
| 4,893,198 A | * | 1/1990 | Little | ......................... | 360/14.1 |
| 5,717,879 A | * | 2/1998 | Moran et al. | ................ | 345/716 |
| 5,751,281 A | * | 5/1998 | Hoddie et al. | ............ | 707/500.1 |
| 5,870,097 A | * | 2/1999 | Snyder et al. | ............... | 345/426 |
| 6,011,537 A | * | 1/2000 | Slotznick | ..................... | 345/700 |
| 6,057,833 A | * | 5/2000 | Heidmann et al. | .......... | 345/328 |
| 6,069,633 A | * | 5/2000 | Apparao et al. | ............. | 345/421 |
| 6,084,590 A | * | 7/2000 | Robotham et al. | ........... | 345/419 |
| 6,201,538 B1 | * | 3/2001 | Wugofski | .................... | 345/629 |

* cited by examiner

*Primary Examiner*—Mark Zimmerman
*Assistant Examiner*—Enrique L Santiago
(74) *Attorney, Agent, or Firm*—Frommer Lawrence & Haug LLP; William S. Frommer

(57) ABSTRACT

An information recording and replaying apparatus and a method of controlling the same are provided for manipulating information provided in real time and the other kind of information in a unified manner. A CG image produced by a CG producing apparatus is transferred to an AV server in the form of graphics commands and stored in disk arrays as they are. To replay a CG image, graphics commands are executed in a graphics circuit provided in the AV server to draw a graphics image. As a result, the time required for sending the CG image from the CG producing apparatus to the AV server is substantially reduced. The CG producing apparatus does not require a large-capacity storage for retaining drawn CG image data. The AV server stores the received graphics commands in the disk arrays as they are without expanding to CG image data. As a result, a large portion of the storage space of the disk arrays is not occupied.

14 Claims, 18 Drawing Sheets

INFORMATION RECORDING AND REPLAYING APPARATUS AND METHOD OF CONTROLLING SAME

BACKGROUND OF THE INVENTION

1. Field of the Invention

The present invention relates to an apparatus for recording and replaying real-time information such as video data and audio data and a method of controlling such an apparatus.

2. Description of the Related Art

As multi-channel information providing has been implemented through the widespread use of community antenna televisions or cable televisions (CATV) and so on, the demand has been increasing for simultaneously reproducing a plurality of audio and video items from a single information recording and replaying apparatus, in contrast to a related-art video cassette recorder (VCR). In order to satisfy the demand, an apparatus called audio-video server (AV server) has been available that records and replays audio and video data (AV data), using a recording and replaying medium that allows random access such as a hard disk.

In a video server used in a broadcast station, for example, superimposing a still-frame image for explanation called telop on a material (AV data) previously recorded is generally performed. Such a telop is generally an image made up of a combination of characters and graphics and usually produced through a computer graphics (CG) producing function retained by a personal computer or a workstation and the like.

An apparatus having such a CG producing function (a CG producing apparatus) usually creates a CG image, using a graphics command. The graphics command is generally made up of data for designating a type of character or graphic to draw and data for designating the size and position on the screen and so on of the image. The amount of data making up one CG image is therefore very small.

However, a related-art AV server has a configuration for manipulating a moving image provided in real time, which is incapable of manipulating control commands such as a graphics command described above and text data. Consequently, in order to superimpose a CG image on an AV material stored in such an AV server, a graphics command is executed in a CG producing apparatus different from the AV server so as to expand the command to dot-by-dot CG image data of one frame. The CG image data is stored in the CG producing apparatus or an external storage and the data is transferred to the AV server when necessary.

However, when the CG image data in a drawn form is sent to the AV server as described above, the CG producing apparatus or the external storage requires a relatively large amount of storage although the data amount of the original graphics command is very small. This is because the data amount of the CG image data to which the graphics command is expanded is much greater than that of the original graphics command and comparable to a moving image.

It takes extremely long transmission time to transfer such a large amount of data from the CG producing apparatus to the AV server through a network, for example, which may be a factor that affects smooth and rapid processing.

In the related-art technique it is required that a graphics command is executed in a CG producing apparatus different from the AV server so as to expand the command to CG image data, and the CG image data is stored in the CG producing apparatus or an external storage. As a result, a heavy load is applied to the personal computer and the like as the CG producing apparatus. It is inconvenient for the user as well that the operation is complicated.

SUMMARY OF THE INVENTION

It is a first object of the invention to provide an information recording and replaying apparatus and a method of controlling the same for manipulating information provided in real time and the other kind of information in a unified manner. It is a second object of the invention to provide an information recording and replaying apparatus and a method of controlling the same for increasing the speed of processing of the system as a whole without any additional large-capacity storage medium when the processing is performed for superimposing a kind of material on another kind of material provided in real time.

An information recording and replaying apparatus of the invention comprises: a first information recording and replaying means for performing at least one of an operation of recording a first type of information provided in real time on a storage means for storing information and an operation of replaying the first type of information from the storage means; and a second information recording and replaying means for performing at least one of an operation of recording a second type of information other than the first type of information on the storage means and an operation of replaying the second type of information from the storage means. The second information recording and replaying means may be capable of performing input and output of information in a form suitable for the second type of information. The second type of information may be a graphics command.

A method of the invention is provided for controlling an information recording and replaying apparatus for recording information on a storage means for storing information and replaying information from the storage means. The method comprises the steps of: having the apparatus perform at least one of an operation of recording a first type of information provided in real time on the storage means and an operation of replaying the first type of information from the storage means; and having the apparatus perform at least one of an operation of recording a second type of information other than the first type of information on the storage means and an operation of replaying the second type of information from the storage means.

According to the information recording and replaying apparatus and the method of controlling the same of the invention, not only the first type of information provided in real time but also the second type of information other than the first type of information is recorded in the same storage means or replayed from the same storage means.

Another information recording and replaying apparatus of the invention comprises: a recording and replaying means for recording data including video and/or audio data on a recording medium to which nonlinear access is allowed and for replaying the data recorded on the medium; a plurality of input/output processing means for processing the data inputted from an external source and supplying the processed data to the recording and replaying means, and for processing the data outputted from the recording and replaying means and outputting the processed data to outside the apparatus; and a graphics processing means for receiving data for indicating a type of an image to be superimposed on the video data and supplying the data to the recording and replaying means and for outputting graphics data based on the data for indicating outputted from the recording and replaying means. Time slots are each allocated to the input/output processing means and the graphics processing means, respectively, and the input/output processing means and the graphics processing means each perform the processing within the allocated time slots.

Another information recording and replaying method of the invention uses an information recording and replaying means for recording data including video and/or audio data on a recording medium to which nonlinear access is allowed and for replaying the data recorded on the medium. The method includes: a first step of supplying the data inputted from an external source to the recording and replaying means within an allocated time slot; a second step of outputting the data from the information recording and replaying means to outside the apparatus within the time slot; a third step of receiving data for indicating a type of an image to be superimposed on the video data and supplying the data to the recording and replaying means within an allocated time slot; and a fourth step of outputting the data for indicating from the recording and replaying means within the time slot, generating graphics data from the data for indicating and outputting the graphics data.

Other and further objects, features and advantages of the invention will appear more fully from the following description.

DETAILED DESCRIPTION OF THE PREFERRED EMBODIMENTS

Preferred embodiments of the invention will now be described in detail with reference to the accompanying drawings.

Figure 1:
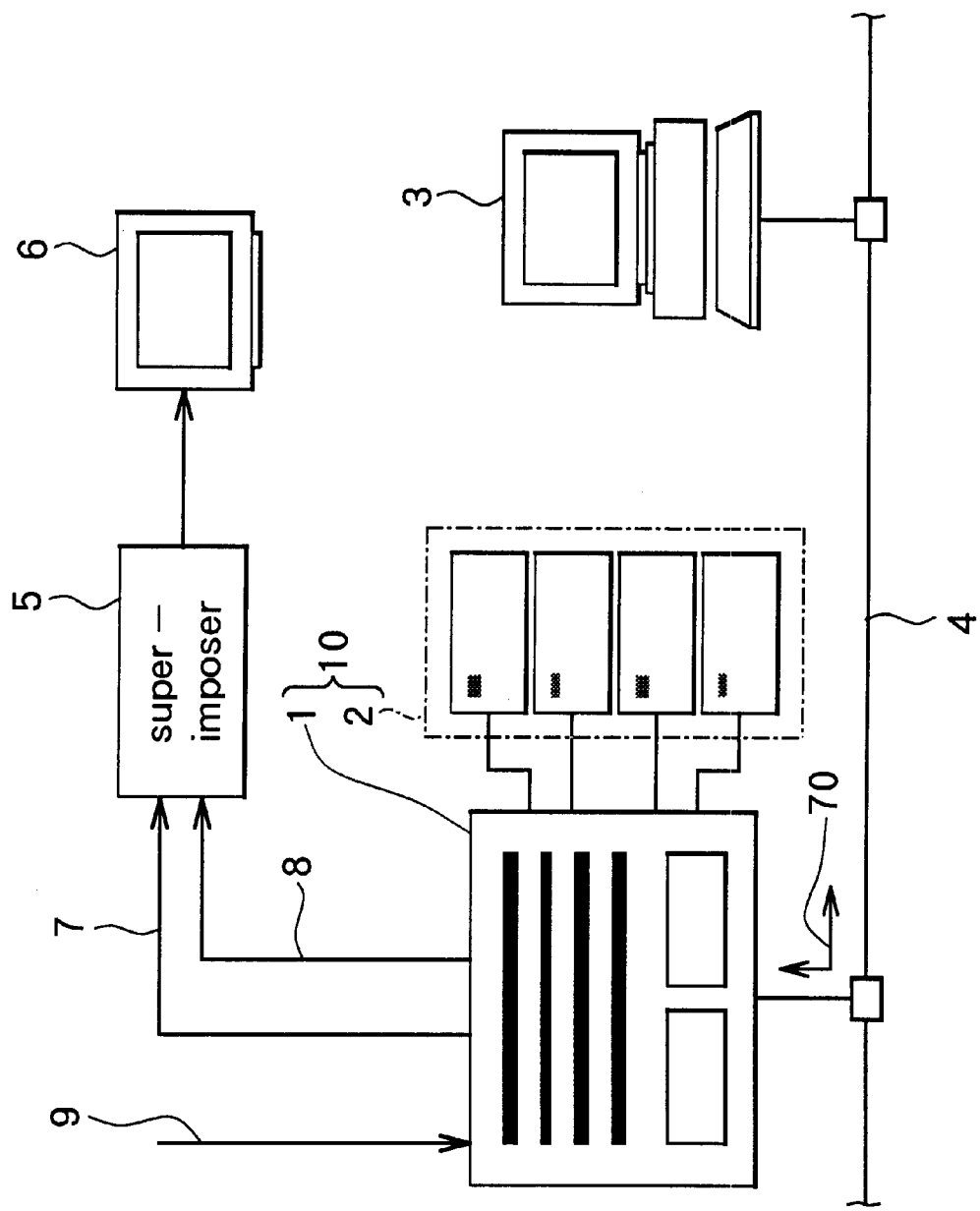
FIG. 1 is a block diagram of an AV recording and replaying system including an AV server as an information recording and replaying apparatus of an embodiment of the invention.

FIG. 1 is a schematic view of an AV recording and replaying system including an AV server 1 as an information recording and replaying apparatus of an embodiment of the invention. The AV recording and replaying system comprises: the AV server 1 and disk arrays 2 forming an AV server system 10; a CG producing apparatus 3 connected to the AV server 1 through a communication path 4 such as an Ethernet; a superimposer 5 connected to the AV server 1; and a monitor 6 connected to the superimposer 5. The disk arrays 2 correspond to 'information storage means' of the invention.

The AV server system 10 is used as a multi-channel AV server and has a configuration for providing a plurality of channels of AV data as information provided in real time. As will be described later, the disk arrays 2 of the AV server system 10 include a plurality of disk arrays including large-capacity storage media and are capable of retaining not only AV data but also text data and a non-real time command such as a graphics command for drawing a CG image. The AV server 1 of the AV server system 10 includes various control boards and controls the operation of the AV server system 10 as a whole as described below. The AV data corresponds to 'first type of information' of the invention. The graphics command corresponds to 'second type of information' of the invention.

The superimposer 5 is provided for superimposing graphics image data 8 as a CG image such as a telop on AV output data 7 as moving image data supplied from the AV server 1. When necessary, the superimposer 5 may include a switcher function for selecting and inputting one of a plurality of items of the AV output data 7 outputted from the AV server 1.

The monitor 6 is provided for displaying an image on which superimposing processing is performed by the superimposer 5. The monitor 6 may be a television picture tube or a monitor for a computer made up of a cathode-ray tube (CRT) or a liquid crystal display (LCD).

Figure 8:
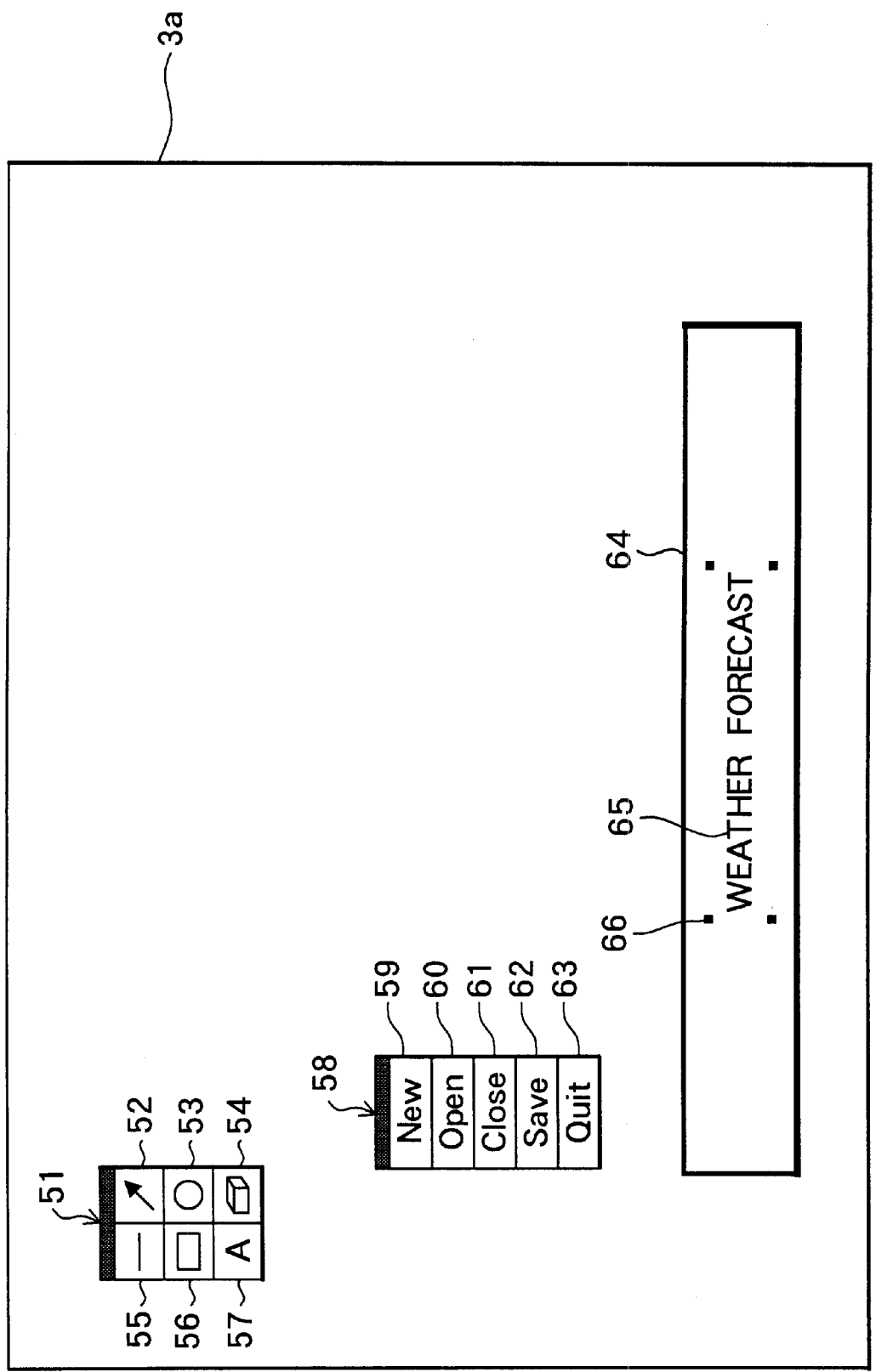
FIG. 8 illustrates an example of the screen display of the CG producing apparatus shown in FIG. 1.

The CG producing apparatus 3 may be made up of a personal computer or a workstation and the like and generates a graphics command for drawing a still-frame image (a CG image such as a telop) to be superimposed on a moving image. The CG image may be an image as shown in FIG. 8. The graphics command may be a string of data in a format as shown in FIG. 9. FIG. 8 and FIG. 9 will be described in detail later. In addition, the CG producing apparatus 3 accesses the AV server system 10 through the communication path 4 and sends a generated graphics command 70 to the AV server system 10, reads the graphics command stored in the AV server system 10, and instructs the AV server system 10 to replay or stop AV data and to replay a CG image by the graphics command and so on.

Figure 2:
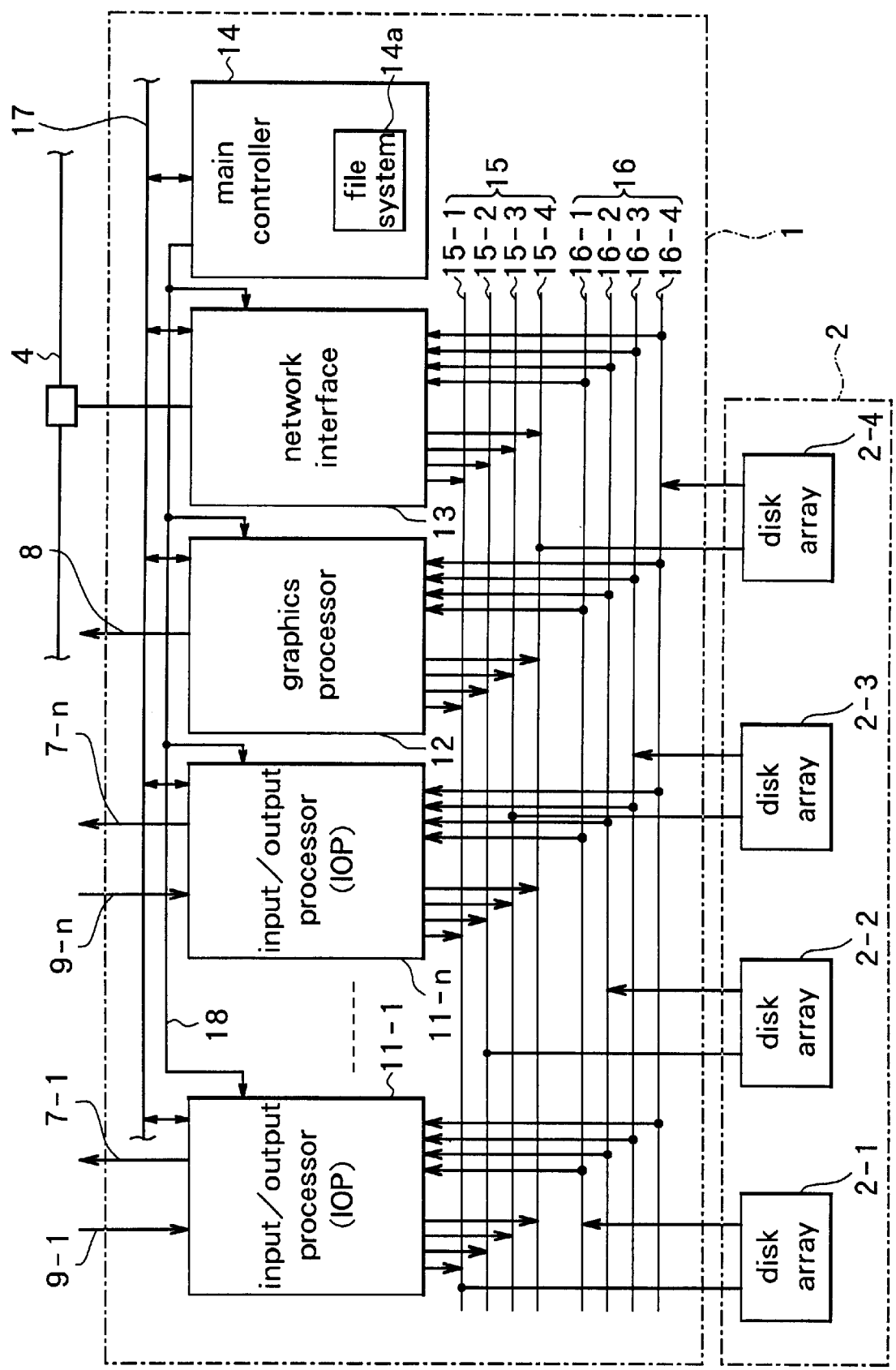
FIG. 2 is a block diagram illustrating the main part of the AV server shown in FIG. 1.

FIG. 2 is a schematic diagram of the AV server system 10 shown in FIG. 1. The AV server system 10 includes the AV server 1 for controlling recording and replaying of AV data and the disk arrays 2 made up of a plurality of disk arrays 2-1 to 2-4 for storing AV data. Graphics commands sent from the CG producing apparatus 3 through the communication path 4 are stored in the disk arrays 2-1 to 2-4 as well.

The AV server 1 comprises: a plurality of input/output processors 11-1 to 11-n (where 'n' is an integer of 2 or above) called IOP each for accessing the disk arrays 2-1 to 2-4 for AV data recording or replaying in a time-division manner in each time slot, that is, a temporal division into which a specific time interval is divided; a graphics processor 12 for performing graphics processing based on a given graphics command (that will be described in detail with reference to FIG. 9) and outputting a dot-by-dot CG image data; a network interface 13 for communicating with the CG producing apparatus 3 and other terminals through the communication path 4; a main controller 14 for controlling the AV server 1 as a whole; and descending data buses 15-1 to 15-4 and ascending data buses 16-1 to 16-4 as data transfer paths for connecting the input/output processors 11-1 to 11-n, the graphics processor 12 and the network interface 13 to the disk arrays 2-1 to 2-4. The input/output processors 11-1 to 11-n, the graphics processor 12 and the network interface 13 (each of which will be called functional unit when generalized) and the main controller 14 are connected to one another with a communication bus 17 for transferring internal control commands (described later). The communication bus 17 may be made of a versa module europe bus (VME). The main controller 14 supplies a time slot signal 18 (described later) to each functional unit. Each functional unit described above may be made up of a detachable unit board so that it is easy to provide an additional unit or remove one when necessary. The input/output processors 11-1 to 11-n each correspond to a 'first information recording and replaying means' of the invention. The network interface 13 and the graphics processor 12 correspond to a 'second information recording and replaying means' of the invention.

The descending data buses 15-1 to 15-4 transfer data from each functional unit to the disk arrays 2-1 to 2-4. The ascending data buses 16-1 to 16-4 transfer data in the reverse direction. The number of the descending data buses 15-1 to 15-4 and the number of the ascending data buses 16-1 to 16-4 are each equal to the number of the disk arrays 2-1 to 2-4. A pair of the descending data bus 15-i and the ascending data bus 16-i (where 'i' is any of 1 to 4) are connected to the single disk array 2-i and a plurality of functional units (described above). That is, the single disk array 2-i is connected to a plurality of the functional units through the one pair of the descending data bus 15-i and the ascending data bus 16-i. Each functional unit is connected to a plurality of pairs of data buses (the pair of the descending data bus 15-1 and the ascending data bus 16-1 through the pair of the descending data bus 15-4 and the ascending data bus 16-4).

The input/output processor 11-j (where j=1 to n) includes an input port (not shown) for inputting AV input data 9-j and an output port (not shown) for outputting AV output data 7-j. For recording AV data on the disk arrays 2-1 to 2-4, the input/output processor 11-j converts the inputted AV input data 9-j into a specific format and splits the data into four data streams. Through the descending data buses 15-1 to 15-4, the data streams are each sent to the disk arrays 2-1 to 2-4, together with an AV record command for instructing to record the AV data. For replaying AV data in the disk arrays 2-1 to 2-4, the input/output processor 11-j sends AV replay commands for instructing to replay the AV data each to the disk arrays 2-1 to 2-4 through the descending data buses 15-1 to 15-4. The input/output processor 11-j then multiplexes and converts the AV data replayed at the disk arrays 2-1 to 2-4 sent through the ascending data buses 16-1 to 16-4 into a specific format, and outputs the data as AV output data 7-j to an external component (that is, the superimposer 5 shown in FIG. 1 in the embodiment). Recording and replaying of data on a plurality of the disk arrays 2-1 to 2-4 are made through splitting and multiplexing data as described so far so that high-speed and large-capacity recording is achieved through the use of cheap, low-speed and small-capacity media. The configuration of the input/output processor 11-j will be described in detail later.

Through the descending data buses 15-1 to 15-4, the graphics processor 12 sends commands for reading graphics commands (graphics command read commands) each stored in the disk arrays 2-1 to 2-4 to the disk arrays 2-1 to 2-4. The graphics processor 12 multiplexes the data (graphics command data) forming the graphics commands read from the disk arrays 2-1 to 2-4 and sent through the ascending data buses 16-1 to 16-4. The graphics processor 12 then performs graphics processing based on the graphics command thereby obtained and outputs graphics image output data 8 as a CG image dot by dot. In FIG. 2 the arrows starting from the graphics processor 12 towards the descending data buses 15-1 to 15-4 indicate the flows of the graphics command read commands. The arrows starting from the ascending data buses 16-1 to 16-4 towards the graphics processor 12 indicate the flows of the read graphics command data. No AV data as it is is sent between the data buses and the graphics processor 12. The configuration of the graphics processor 12 will be described in detail later.

When graphics commands are sent from the CG producing apparatus 3 (FIG. 1) or any other terminal (not shown) through the communication path 4, the network interface 13 sends commands (graphics command write commands) for writing the graphics commands in the disk arrays 2-1 to 2-4 to the disk arrays 2-1 to 2-4 through the descending data buses 15-1 to 15-4. The graphics commands are thereby written in the disk arrays 2-1 to 2-4. When commands for reading graphics commands are sent from the CG producing apparatus 3, for example, through the communication path 4, the network interface 13 sends the commands to the disk arrays 2-1 to 2-4 through the descending data buses 15-1 to 15-4. The network interface 13 multiplexes the graphics command data read from the disk arrays 2-1 to 2-4 and sent through the ascending data buses 16-1 to 16-4 to produce a graphics command and sends out the command to the CG producing apparatus 3, for example, through the communication path 4.

In response to a command for recording or replaying a moving image (AV record request command or AV replay request command) sent from the CG producing apparatus 3, for example, through the communication path 4 according to the Telnet protocol described later, for example, the network interface 13 generates AV record commands or AV replay commands as corresponding internal control commands. The network interface 13 sends the commands to the input/output processors 11-1 to 11-n through the communication bus 17. When a command (CG replay request command) for reading the graphics commands stored in the disk arrays 2-1 to 2-4 and replaying a CG image is sent from the CG producing apparatus 3, for example, through the communication path 4, the network interface 13 generates a graphics replay command as a corresponding internal control command. The network interface 13 sends the command to the graphics processor 12 through the communication bus 17. The AV record command, the AV replay command and the graphics replay command conform to the Telnet protocol, for example, described later as well.

In FIG. 2 the arrows starting from the network interface 13 towards the descending data buses 15-1 to 15-4 indicate the flows of the graphics command write commands and the graphics command read commands. The arrows starting from the ascending data buses 16-1 to 16-4 towards the graphics processor 12 indicate the flows of the read graphics command data. No AV data is sent between the data buses and the network interface 13. The configuration of the network interface 13 will be described in detail later.

The main controller 14 retains control data required for the operation of the AV server 1 as a whole and has the functions of providing corresponding control data in response to a request from each functional unit. As one of such functions, the main controller 14 comprises a file system 14a for managing files stored in the disk arrays 2-1 to 2-4. The file system 14a provides the correspondence between file names and the addresses in the disk arrays 2-1 to 2-4 (sector numbers, to be specific). If a query is made on a specific file from any of the other functional units through the communication bus 17, the address in one of the disk arrays 2-1 to 2-4 where the file is stored is found out and sent back. The main controller 14 further has the function of supervising time slot control throughout the AV server 1 by time slot signals supplied to the functional units.

In the time slot scheme a specific period of time is divided into time slots the number of which is equal to the total number of the functional units (that is, the total of the input/output processors 11-1 to 11-n, the graphics processor 12 and the network interface 13). The time slots are each allocated to the functional units, respectively, by means of the time slot signal 18. During the period of each time slot, the functional unit to which the time slot is allocated is only allowed to access the disk arrays 2-1 to 2-4.

The disk arrays 2-1 to 2-4 include a plurality of hard disk drives (HDD) as will be described later. For recording AV data sent from an external source, the disk arrays 2-1 to 2-4 each receive AV record commands and the AV data from the input/output processors 11-1 to 11-n through the descending data buses 15-1 to 15-4 and generate parity data base on the AV data. In accordance with the AV record commands, the disk arrays 2-1 to 2-4 record the AV data and the parity data on the recording media of a plurality of the HDDs. For replaying AV data, the disk arrays 2-1 to 2-4 each receive AV replay commands from the input/output processors 11-1 to 11-n through the descending data buses 15-1 to 15-4 and control the HDDs in accordance with the replay commands to replay the AV data. The disk arrays 2-1 to 2-4 then send the AV data to the respective input/output processors 11-1 to 11-n through the ascending data buses 16-1 to 16-4.

Although the number of the disk arrays is four in the example shown in FIG. 2, the number of the disk arrays may be either more than or less than four. In such a case the descending data buses and the ascending data buses which are equal to the disk arrays in number are required.

Figure 3:
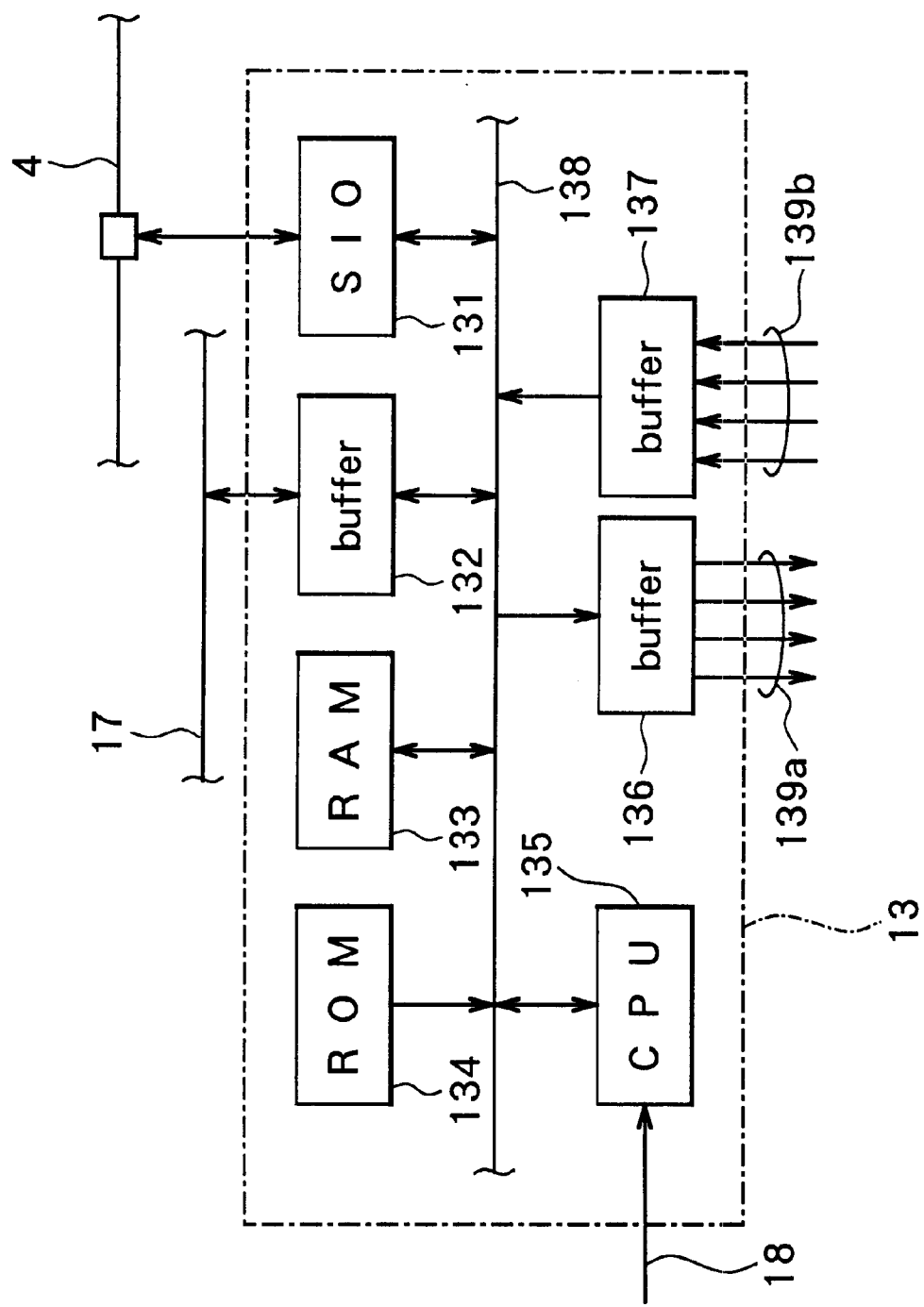
FIG. 3 is a block diagram illustrating the main part of the network interface shown in FIG. 2.

FIG. 3 shows the configuration of the network interface 13 shown in FIG. 2. The network interface 13 comprises: a serial input/output (SIO) section 131 connected to the communication path 4; a buffer 132 connected to the communication bus 17; a random access memory (RAM) 133 as a work memory used for temporary data storage; a read only memory (ROM) 134 retaining a program of the operation of the network interface 13 as a whole; a central processing unit (CPU) 135 for controlling the operation of the network interface 13 as a whole; a buffer 136 connected to the descending data buses 15-1 to 15-4 through descending data lines 139a; and a buffer 137 connected to the ascending data buses 16-1 to 16-4 through ascending data lines 139b. The sections of the network interface 13 are connected to one another through an internal bus 138.

The serial input/output section 131 receives serial commands or data sent from the CG producing apparatus 3, for example, through the communication path 4 and converts the commands or data into parallel data and sends the data to each section through the internal bus 138. The serial input/output section 131 converts parallel data sent from each section through the internal bus 138 into serial data and sends the data onto the communication path 4. The buffer 132 temporarily holds control commands sent from the CPU 135 through the internal bus 138 and sends out the commands onto the communication bus 17 with specific timing. The buffer 132 temporarily holds control commands received through the communication bus 17 and sends out the commands onto the internal bus 138 with specific timing.

The ROM 134 holds a program called network file system (NFS) server, a protocol supporting the Telnet protocol and so on. When a plurality of NFS clients (the CG producing apparatus 3 and other terminals) connected to the communication path 4 access files stored in the AV server system 10, the NFS server functions such that the NFS clients appear to access the files on their own disks. As a result, the user of the CG producing apparatus 3 may store generated graphics commands in the disk arrays 2-1 to 2-4 and read the graphics commands stored in the disk arrays 2-1 to 2-4 as if the user were accessing the disk in the CG producing apparatus 3. The CG producing apparatus 3 and the other terminals each contain a program called NFS client for achieving such processing.

The Telnet protocol is one of the Internet standard protocols for terminal emulation that allows a terminal at hand to log in to and directly operate the host at a remote site. In the embodiment the protocol for communication made through the communication bus 17 is defined in accordance with the Telnet. As a result, the user of the CG producing apparatus 3, for example, may log in to the AV server system 10 in accordance with the Telnet and execute an AV replay request command including instruction to replay and designating the output port of one of the input/output processors 11-1 to 11-n. The AV output data 7-i is thereby outputted through the designated input/output processor 11-i. Inputting of AV input data 9-i to the AV server system 10 may be performed in a similar manner from the CG producing apparatus 3, for example.

The CPU 135 decodes commands received by the serial input/output section 131 from the CG producing apparatus 3, for example, through the communication path 4, and outputs corresponding internal control commands and data required for executing the control commands to the buffers 132, 136 and 137 through the internal bus 138. To be specific, the internal control commands include: an AV record command and an AV replay command for the input/output processors 11-1 to 11-n; a graphics replay command for the graphic processor 12; and a graphics command write command and a graphics command read command for the disk arrays 2. The data required for executing the internal control commands include: graphics command data sent from the CG producing apparatus 3; file storage addresses or file destination addresses in the disk arrays 2-1 to 2-4; and data indicating which of the input/output processors 11-1 to 11-n to select as the output port or the input port.

The file storage address is obtained through the CPU 135 by accessing the file system 14a of the main controller 14 via the communication bus 17 when the CG producing apparatus 3, for example, makes a request for reading a graphics command. The file storage address is address data that indicates in which sector of the disk arrays 2-1 to 2-4 the graphics command data of the requested file name is written.

The file destination address is obtained through the CPU 135 by accessing the file system 14a of the main controller 14 via the communication bus 17 when the CG producing apparatus 3, for example, makes a request for writing graphics command data. The file destination address is address data that indicates in which sector of the disk arrays 2-1 to 2-4 the graphics command data of the requested file name is to be written.

Of the internal control commands and required data described above, the AV record command and the AV replay command are each sent to the buffer 132, together with data indicating which of the input/output processors 11-1 to 11-n to select. The commands are then each sent to the corresponding one of the input/output processors 11-1 to 11-n through the communication bus 17. The graphics replay command is sent to the buffer 132 as well and further sent to the graphics processor 12 through the communication bus 17. The graphics command data write command is sent to the buffer 136, together with the file destination address of the disk arrays 2-1 to 2-4 and the graphics command. The graphics command read command is sent to the buffer 136, together with the file destination address. The internal control commands and data thus sent to the buffer 136 are split into four and sent to the disk arrays 2-1 to 2-4. The graphics command data read from the disk arrays 2-1 to 2-4 is preliminarily stored in the buffer 137 and multiplexed to be the graphics command therein. The graphics command is then sent to the serial input/output section 131 through the internal bus 138 and further sent to the CG producing apparatus 3 through the communication path 4.

The CPU 135 performs timing control so as to access the disk arrays 2-1 to 2-4 in its own time slot defined by the time slot signal 18 inputted from the main controller 14.

Figure 4:
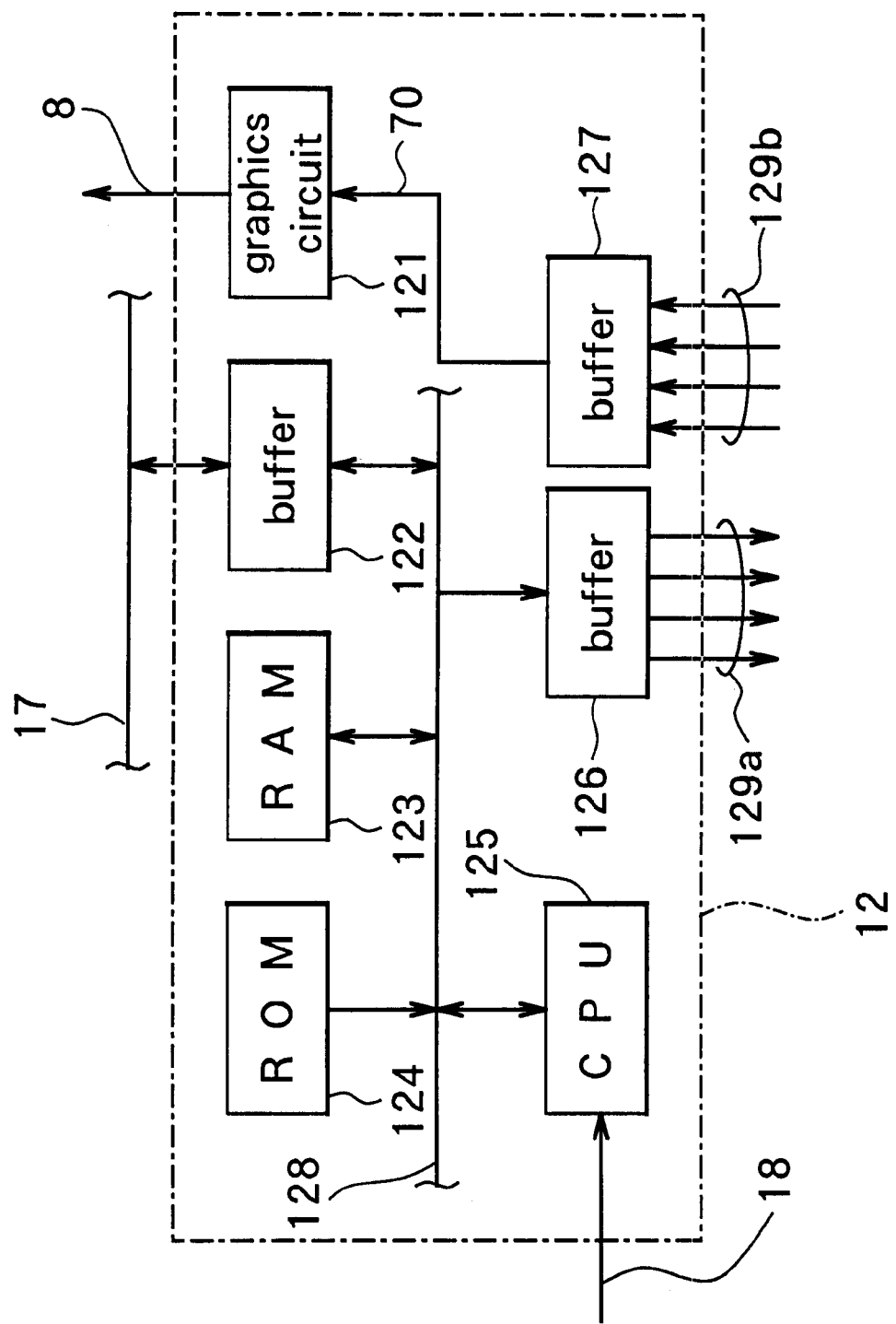
FIG. 4 is a block diagram illustrating the main part of the graphics processor shown in FIG. 2.

FIG. 4 illustrates the configuration of the graphics processor 12 shown in FIG. 2. The graphic processor 12 comprises: a graphics circuit 121; a buffer 122 connected to the communication bus 17; a RAM 123 as a work memory used for temporary data storage; a ROM 124 retaining a program of the operation of the graphics processor 12 as a whole; a CPU 125 for controlling the operation of the graphics processor 12 as a whole; a buffer 126 connected to the descending data buses 15-1 to 15-4 through descending data lines 129a; and a buffer 127 connected to the ascending data buses 16-1 to 16-4 through ascending data lines 129b. The sections of the graphics processor 12 are connected to one another through an internal bus 128.

Figure 5:
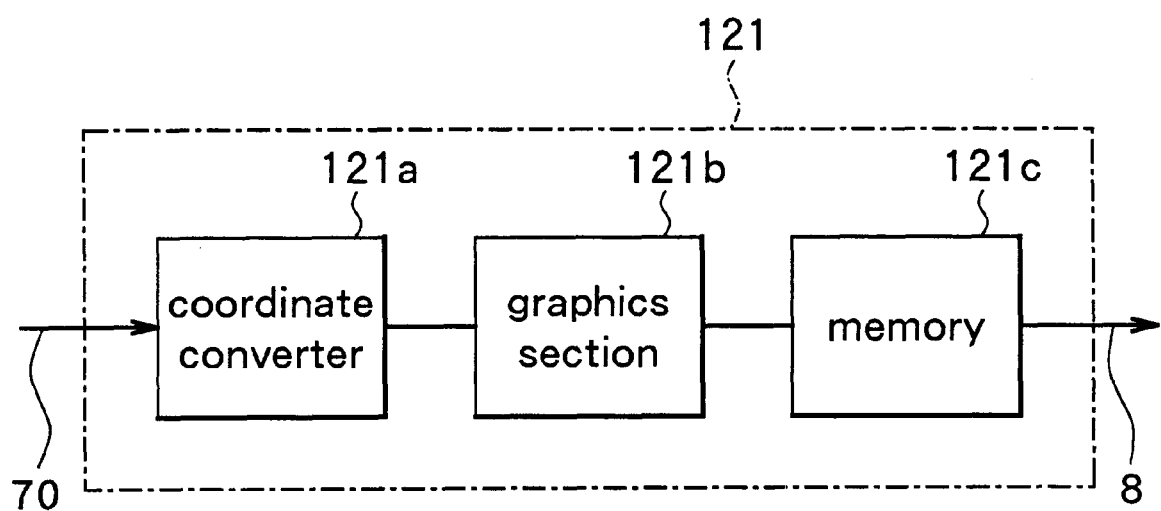
FIG. 5 is a block diagram illustrating the main part of the graphics circuit shown in FIG. 4.

As shown in FIG. 5, the graphics circuit 121 may include a coordinate converter 121a, a graphics section 121b, and a memory 121c. The coordinate converter 121a converts the graphics command of three-dimensional coordinates into two-dimensional coordinates and input the result to the graphics section 121b. Based on the inputted graphics command of two-dimensional coordinates, the graphics section 121b generates dot-by-dot CG image data that represents an actual telop and the like and inputs the data to the memory 121c. The memory 121c outputs CG image data for one frame when all the data items are received. The graphics circuit 121 corresponds to a 'graphics means' of the invention.

The ROM 124 retains the program executed by the CPU 125 to which the CPU 125 refers when necessary. The CPU 125 controls a series of operation of receiving the graphics replay commands from the network interface 13, reading the graphics commands from the disk arrays 2-1 to 2-4, inputting the commands to the graphics circuit 121, and drawing up CG image data at the graphics circuit 121. The series of operation is performed during the time slot period allocated by the time slot signal 18 supplied from the main controller 14.

The buffer 122 has the function of preliminarily retaining the internal control commands sent through the communication bus 17 and sending the commands to the CPU 125. Such internal control commands include the graphics replay command sent from the network interface 13. The buffer 126 has the function of preliminarily retaining the graphics command read commands issued by the CPU 125 and outputting the commands to the disk arrays 2-1 to 2-4. The buffer 127 has the function of multiplexing the graphics command data read from the disk arrays 2-1 to 2-4 to form the graphics command and supplying the command to the graphics circuit 121.

As thus described, the graphics processor 12 performs the operation of: sending the graphics command read commands for reading the graphics commands stored in the disk arrays 2-1 to 2-4 through the descending data buses 15-1 to 15-4 to the disk arrays 2-1 to 2-4, multiplexing the graphics command data read from the disk arrays 2-1 to 2-4 and sent through the ascending data buses 16-1 to 16-4, performing graphics processing based on the graphics command thereby obtained, and outputting the dot-by-dot graphics image output data 8 as a CG image.

Figure 6:
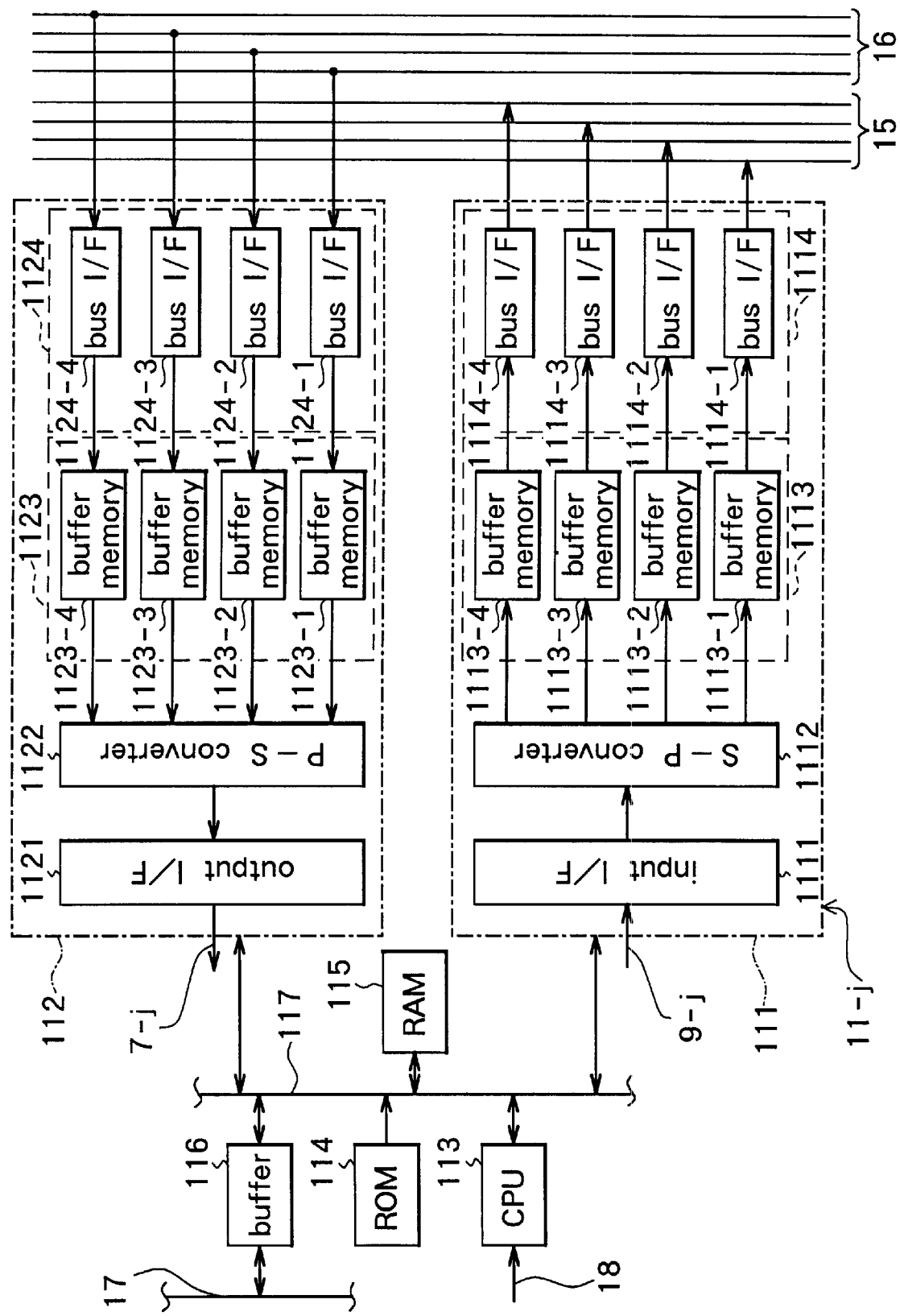
FIG. 6 is a block diagram illustrating the main part of the input/output processor shown in FIG. 2.

FIG. 6 is a schematic view of the input/output processor 11-j shown in FIG. 2. As shown, the input/output processor 11-j comprises: an input processor 111 for performing the operation of recording AV input data 9-j in the disk arrays 2-1 to 2-4; an output processor 112 for performing the operation of replaying and outputting AV output data 7-j from the disk arrays 2-1 to 2-4; a CPU 113 for controlling the input processor 111 and the output processor 112; a ROM 114 retaining a program of the operation of the CPU 113; a RAM 115 as a work memory; and a buffer 116 connected to the communication bus 17. The sections of the input/output processor 11-j are connected to one another with an internal bus 117. The time slot signal 18 is inputted to the CPU 113 from the main controller 14.

The input processor 111 comprises: an input interface 1111 to which the AV input data 9-j is inputted; a serial-parallel (S-P) converter 1112 provided at the output of the input interface 1111; four buffer memories 1113-1 to 1113-4 provided in parallel at the output of the S-P converter 1112; and bus interfaces 1114-1 to 1114-4 each provided at the outputs of the buffer memories 1113-1 to 1113-4, respectively. The outputs of the bus interfaces 1114-1 to 1114-4 are each connected to the respective descending data buses 15-1 to 15-4.

The output processor 112 comprises: bus interfaces 1124-1 to 1124-4 inputs of which are each connected to the respective ascending data buses 16-1 to 16-4; four buffer memories 1123-1 to 1123-4 each provided at the outputs of the respective bus interfaces 1124-1 to 1124-4; a parallel-serial (P-S) converter 1122 provided at the outputs of the buffer memories 1123-1 to 1123-4 and shared by them; and an output interface 1121, provided at the output of the P-S converter 1122, for outputting the AV output data 7-j.

The input interface 1111 extracts effective pixel portions from the inputted AV input data 9-j and supplies the pixel portions to the S-P converter 1112. The S-P converter 1112 performs processing of splitting the inputted serial AV input data into parallel AV data streams (four data streams in the embodiment) and converting the data streams each into a format for recording. The S-P converter 1112 then inputs the data streams to the respective buffer memories 1113-1 to 1113-4. To be specific, the S-P converter 1112 performs processing of data compressing and encoding and so on. The buffer memories 1113-1 to 1113-4 supply the data streams stored therein each to the respective bus interfaces 1114-1 to 1114-4 with specific timing during the time slot allocated by the time slot signal 18. The bus interfaces 1114-1 to 1114-4 add record commands and destination addresses in the disk arrays 2-1 to 2-4 to the supplied data streams and sends them out to the descending data buses 15-1 to 15-4. The destination addresses are obtained through the CPU 113 by accessing the file system 14a of the main controller 14 via the buffer 116 and the communication bus 17.

The bus interfaces 1124-1 to 1124-4 supply the data streams read from the respective disk arrays 2-1 to 2-4 to the respective buffer memories 1123-1 to 1123-4 through the ascending data buses 16-1 to 16-4 with specific timing during the time slot allocated by the time slot signal 18. The buffer memories 1123-1 to 1123-4 preliminarily retain the inputted data streams and supply the data streams to the P-S converter 1122 with specific timing. The P-S converter 1122 performs processing of expansion and decoding of the data streams inputted from the buffer memories 1123-1 to 1123-4 and converting the decoded four streams of data into one serial data item. The P-S converter 1122 then supplies the data item to the output interface 1121. The output interface 1121 outputs the serial data from the P-S converter 1122 as the AV output data 7-j.

Figure 7:
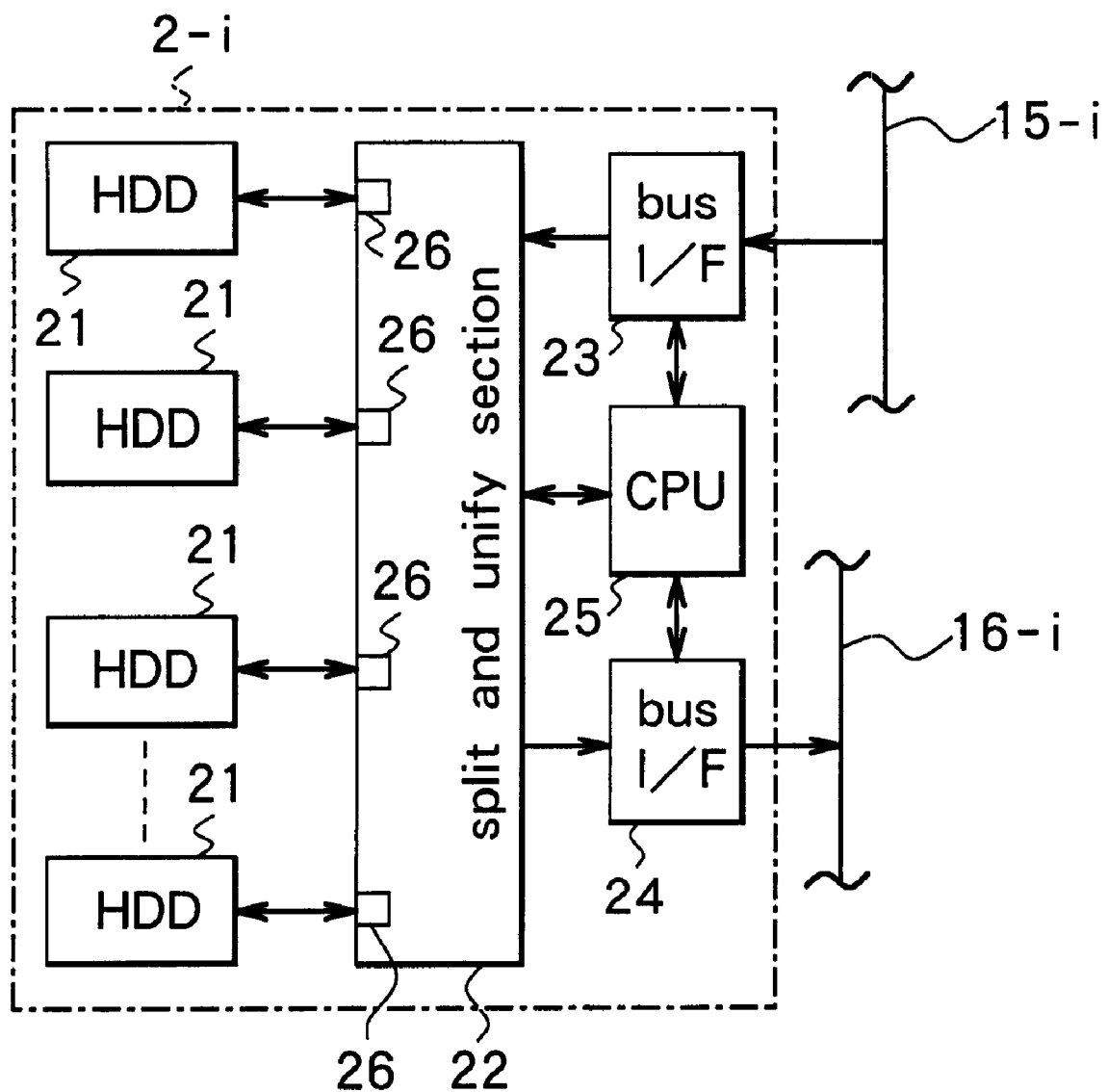
FIG. 7 is a block diagram illustrating the main part of the disk array shown in FIG. 2.

Referring to FIG. 7, the configuration of the disk array 2-i will now be briefly described. FIG. 7 is a schematic view of the disk array 2-i. The disk array 2-i comprises: a plurality of HDDs 21 as information recording and replaying means for recording data items into which the data to record is split and parity data for error detection and correction of the data to record; and a split and unify section 22 connected to the HDDs 21; a bus interface 23 for connecting the split and unify section 22 to the descending data bus 15-i; a bus interface 24 for connecting the split and unify section 22 to the ascending data bus 16-i; and a CPU 25 as a means for controlling the disk array 2-i as a whole. The disk array 2-i thus has the configuration of redundant array of inexpensive disks (RAID) that achieves redundancy, an increase in transfer rate of recording and replaying, and an increase in capacity.

The HDDs 21 each access a specific location on a hard disk (magnetic disk) platter as a recording means that allows random access and perform recording or replaying of data on the hard disk platter. One of the HDDs 21 is dedicated to parity data. The split and unify section 22 includes small computer system interface (SCSI) controllers 26 each provided for the respective HDDs 21 for controlling the HDDs 21. The split and unify section 22 includes a buffer (not shown) for temporarily storing AV data and graphics command data inputted from the descending data bus 15-i and AV data and graphics command data replayed from the HDDs 21.

The bus interface 23 includes a buffer (not shown) for storing the command for instructing to record or to replay. The bus interface 23 divides AV data and so on inputted from the descending data bus 15-i from the command for instructing to record or to replay, and stores the latter command in the buffer and outputs the former AV data and so on to the split and unify section 22.

The CPU 25 is connected to the split and unify section 22 and the bus interfaces 23 and 24. The CPU 25 determines the content of the command for instructing to record or to replay stored in the bus interface 23, instructs the SCSI controllers 26 of the split and unify section 22, and controls the HDDs 21. The CPU 25 receives status data from the SCSI controllers 26. The status data indicates whether the instruction given to the SCSI controllers 26 is executed or not and whether there is any error in the HDDs 21. The CPU 25 outputs the status data to the ascending data bus 16-i through the bus interface 24.

Reference is now made to FIG. 8 and FIG. 9 for describing graphical user interface (GUI) used for generating the graphics command by the CG producing apparatus 3 shown in FIG. 1 and the format configuration of the graphics command. FIG. 8 shows an example of a display 3a of the CG producing apparatus 3. FIG. 9 shows an example of the format configuration of the graphics command representing the CG image shown on the display 3a of FIG. 8.

The CG producing apparatus 3 comprises the GUI for generating and editing the graphics command. As shown in FIG. 8, the GUI includes a tool menu 51 and a command menu 58. The tool menu 51 is used for processing relating to graphic drawing and constantly displayed during the operation of the GUI. The command menu 58 is used for saving the frame on which drawing is made, reading a graphics command file already stored and so on. The command menu 58 is not constantly displayed but appears by clicking the right button of a mouse not shown.

In the example the tool menu 51 includes six kinds of drawing items of a select item 52, a circle item 53, an eraser item 54, a straight line item 55, a quadrangle item 56, and a character item 57. The select item 52 is used for selecting or shifting a drawn graphic or character. The eraser item 54 is used for erasing a drawn graphic and the like. The circle item 53, the straight line item 55, the quadrangle item 56, and the character item 57 are each used for drawing a circle, a straight line, a quadrangle, and a character, respectively. The tool menu 51 may be shifted by dragging (that is, shifting the mouse while clicking the left button) the hatched portion of the tool menu 51. In addition to the items shown, items for drawing other figures such as a rectangle and an ellipse may be provided.

In the example, the command menu 58 includes five drawing items of a New item 59, an Open item 60, a Close item 61, a Save item 62 and a Quit item 63. The New item 59 is used for clearing the present frame and creating a new frame. The Open item 60 is used for reading the graphics command stored as a file and displaying the graphic. The Close item 61 is used for closing the present frame. The Save item 62 is used for saving the present frame as a file. The Quit item 63 is used for terminating the GUI processing. In addition to the items shown, items having other file operating functions may be provided.

In the example shown in FIG. 8, characters 65 of 'WEATHER FORECAST' are drawn in a rectangular frame 64. Dots 66 at four corners around the characters 65 indicate that the characters are selected. Such a CG image is stored in a disk device and the like (not shown) of the CG producing apparatus 3 as a graphics command file of the format as shown in FIG. 9, for example.

Figure 9A:
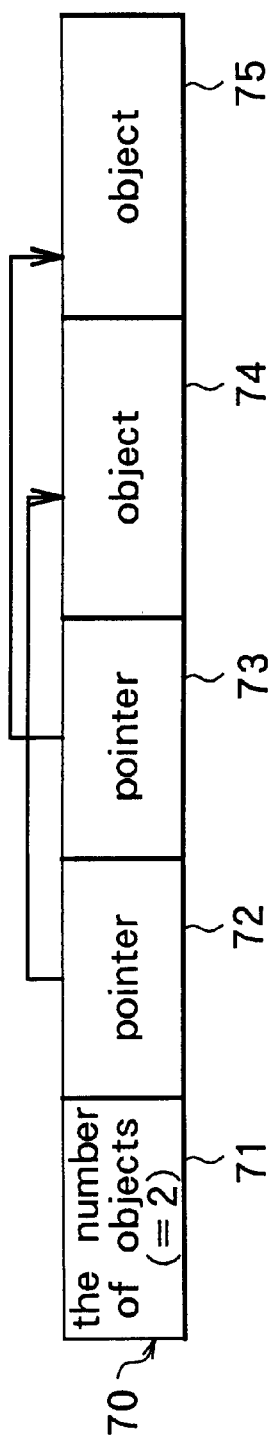
FIG. 9A, FIG. 9B and FIG. 9C illustrate an example of format configuration of a graphics command generated by the CG producing apparatus shown in FIG. 1.
Figure 9B:
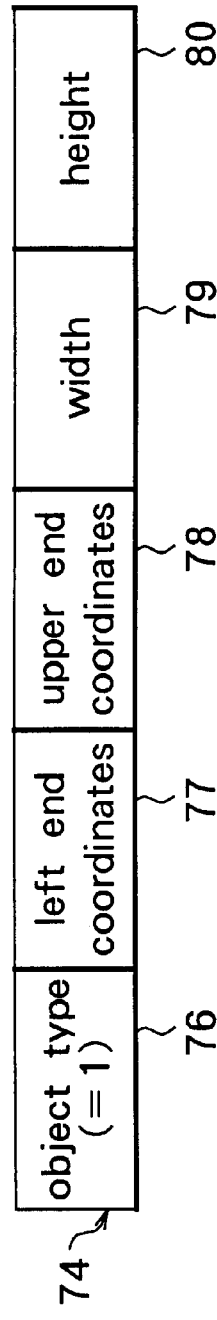
Figure 9C:
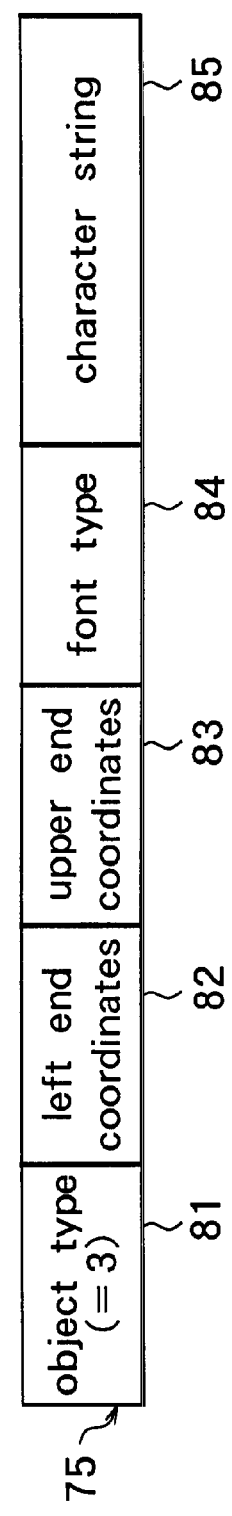

FIG. 9A illustrates the entire format of a graphics command 70 representing the entire CG image shown in FIG. 8. FIG. 9B illustrates the content of an object 74 corresponding to the frame 64 of the CG image. FIG. 9C illustrates the content of an object 75 corresponding to the characters 65 of 'WEATHER FORECAST' of the CG image. The object is data representing a graphics image of a minimum unit. As shown in FIG. 9A, the graphics command 70 of the example includes data 71 indicating the number of objects (two in the example), two pointers 72 and 73 for indicating the individual objects, and two objects 74 and 75. As shown in FIG. 9B, the object 74 includes data 76 indicating the type of the object, data 77 indicating coordinates of the object at the left end, data 78 indicating coordinates of the object at the upper end, data 79 indicating the width of the object, and data 80 indicating the height of the object. As shown in FIG. 9C, the object 75 includes data 81 indicating the type of the object, data 82 indicating coordinates of the object at the left end, data 83 indicating coordinates of the object at the upper end, data 84 indicating the font type of the characters as the object, and data 85 indicating the character string ('WEATHER FORECAST' in the example) as the object. The object type may be defined as '0' for a straight line, '1' for a quadrangle, '2' for a circle, and '3' for a character. In the example the object type of the object 74 is '1' and the object type of the object 75 is '3', accordingly.

Referring to FIG. 10 to FIG. 16, the operation of the AV recording and replaying system having the configuration described so far will now be described.

Figure 10:
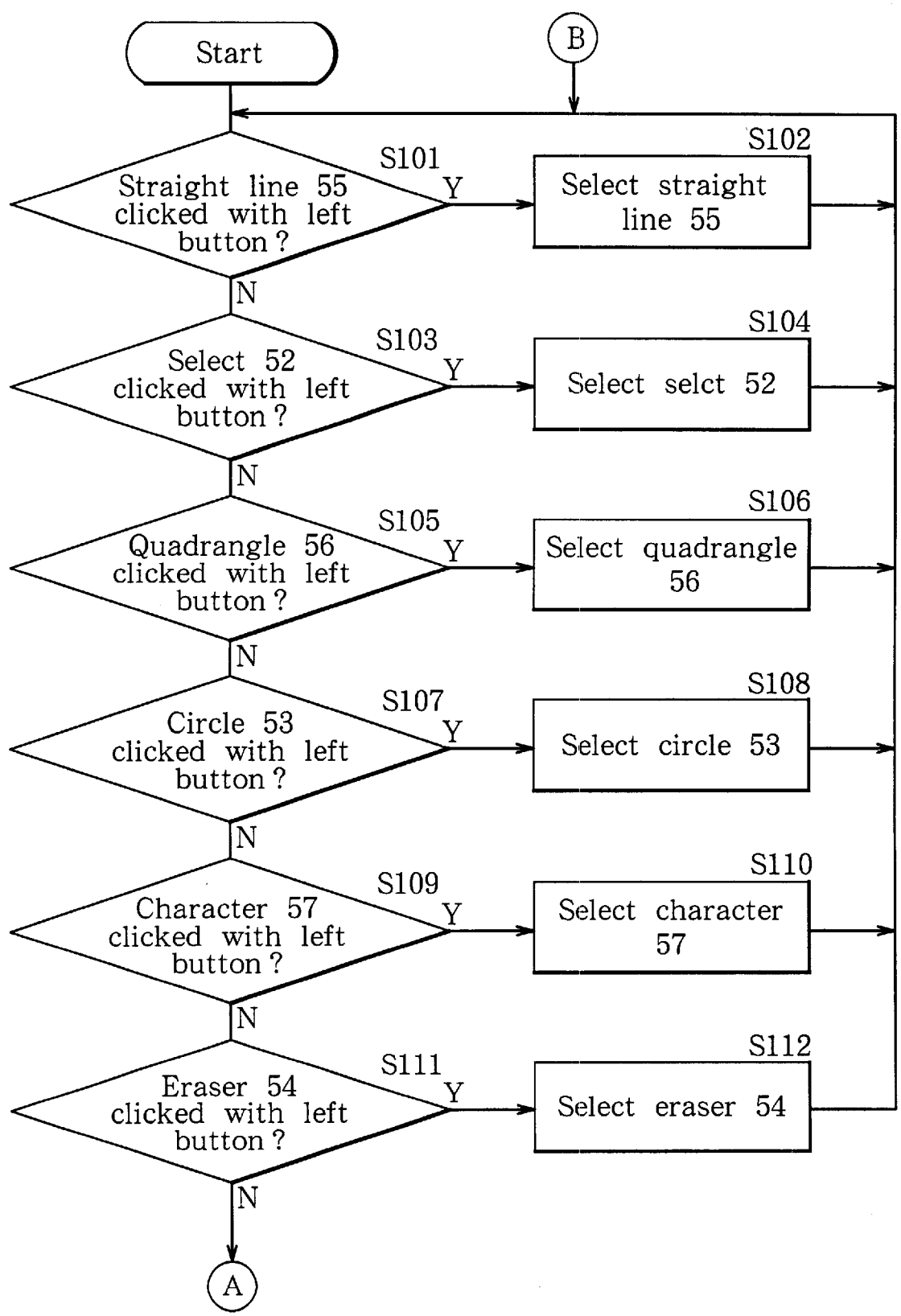
FIG. 10 is a flowchart of an example of processing performed by the GUI provided in the CG producing apparatus shown in FIG. 1.
Figure 11:
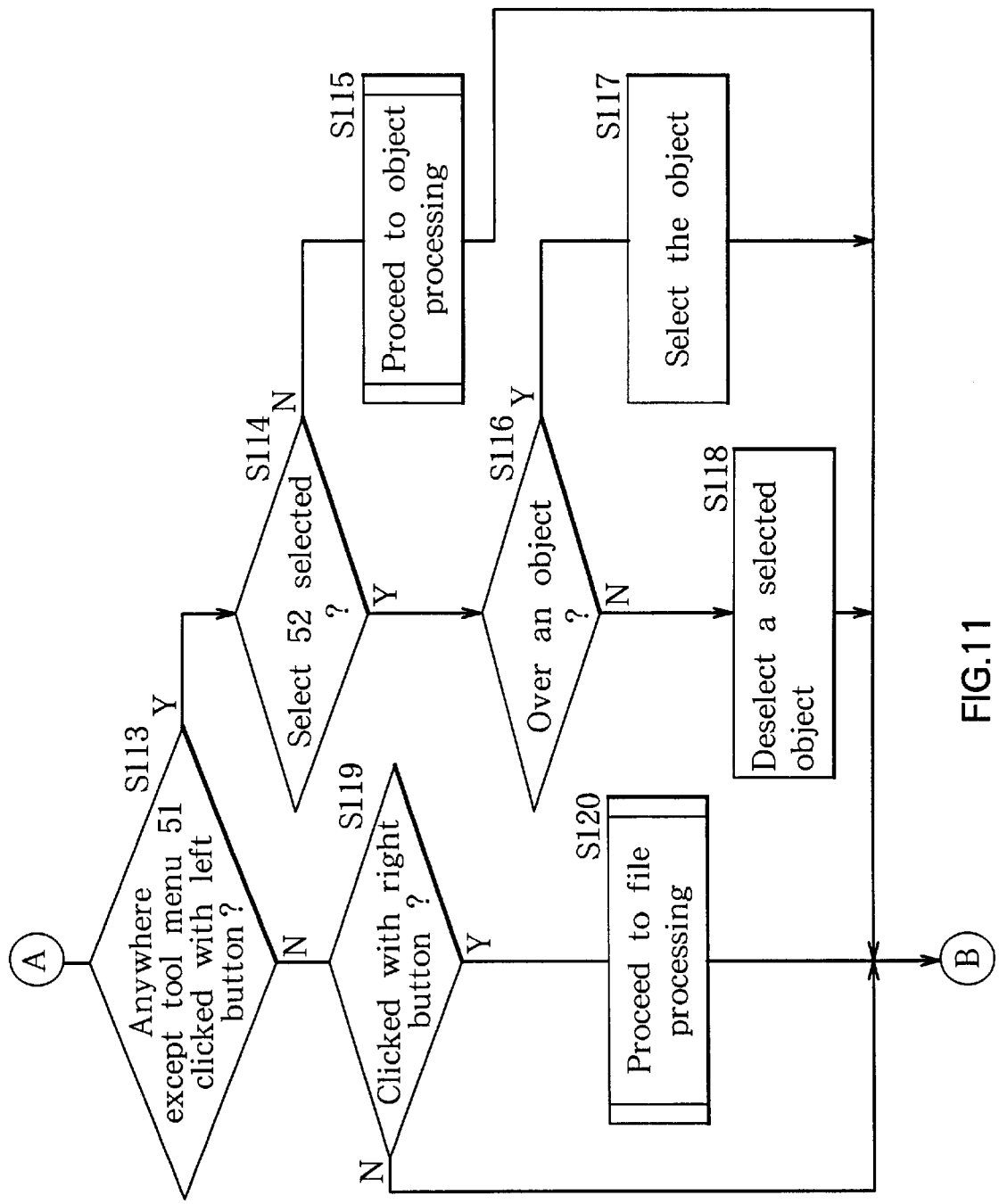
FIG. 11 is a flowchart that follows FIG. 10.
Figure 12:
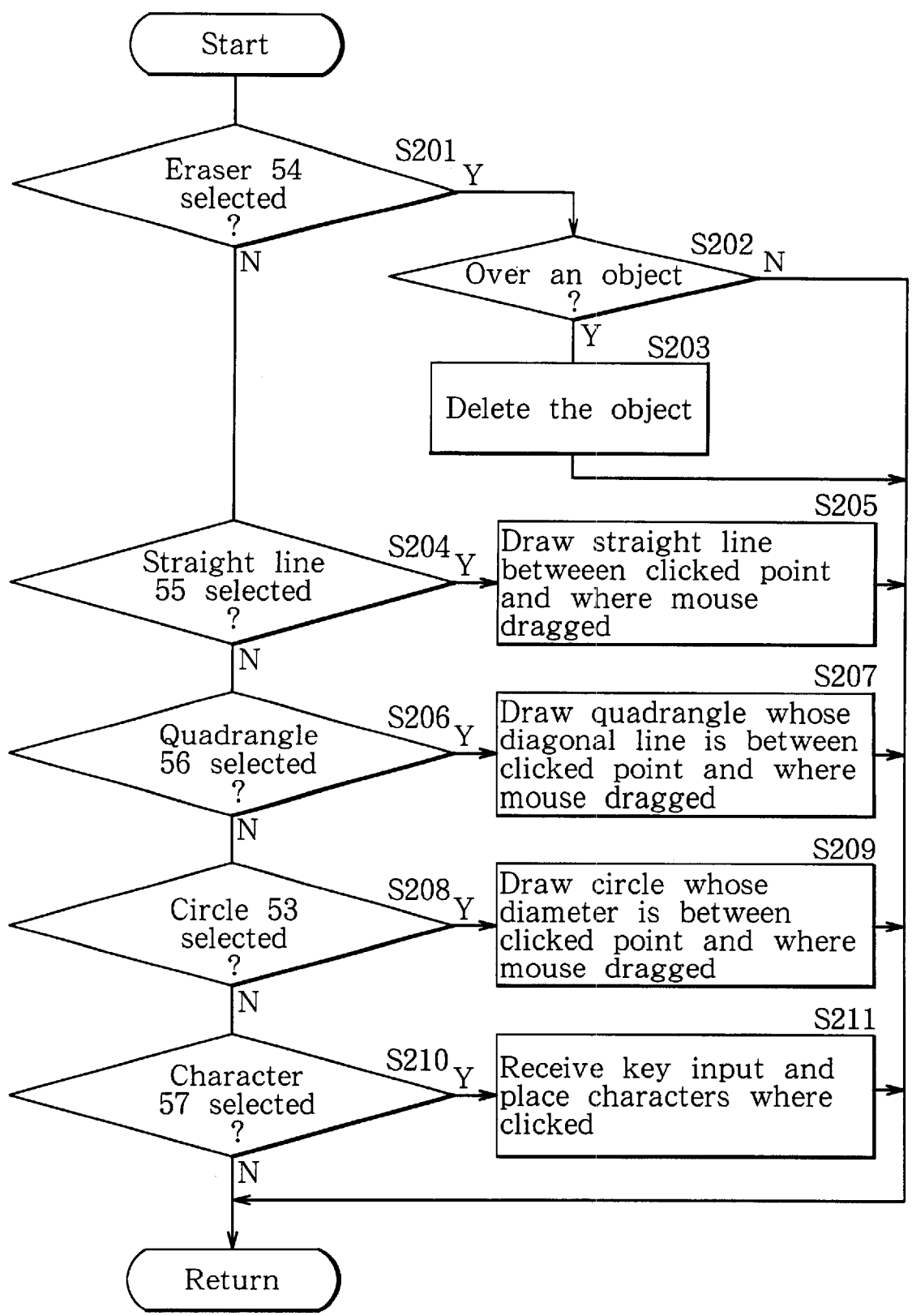
FIG. 12 is a flowchart of an example of object processing shown in FIG. 10.
Figure 13:
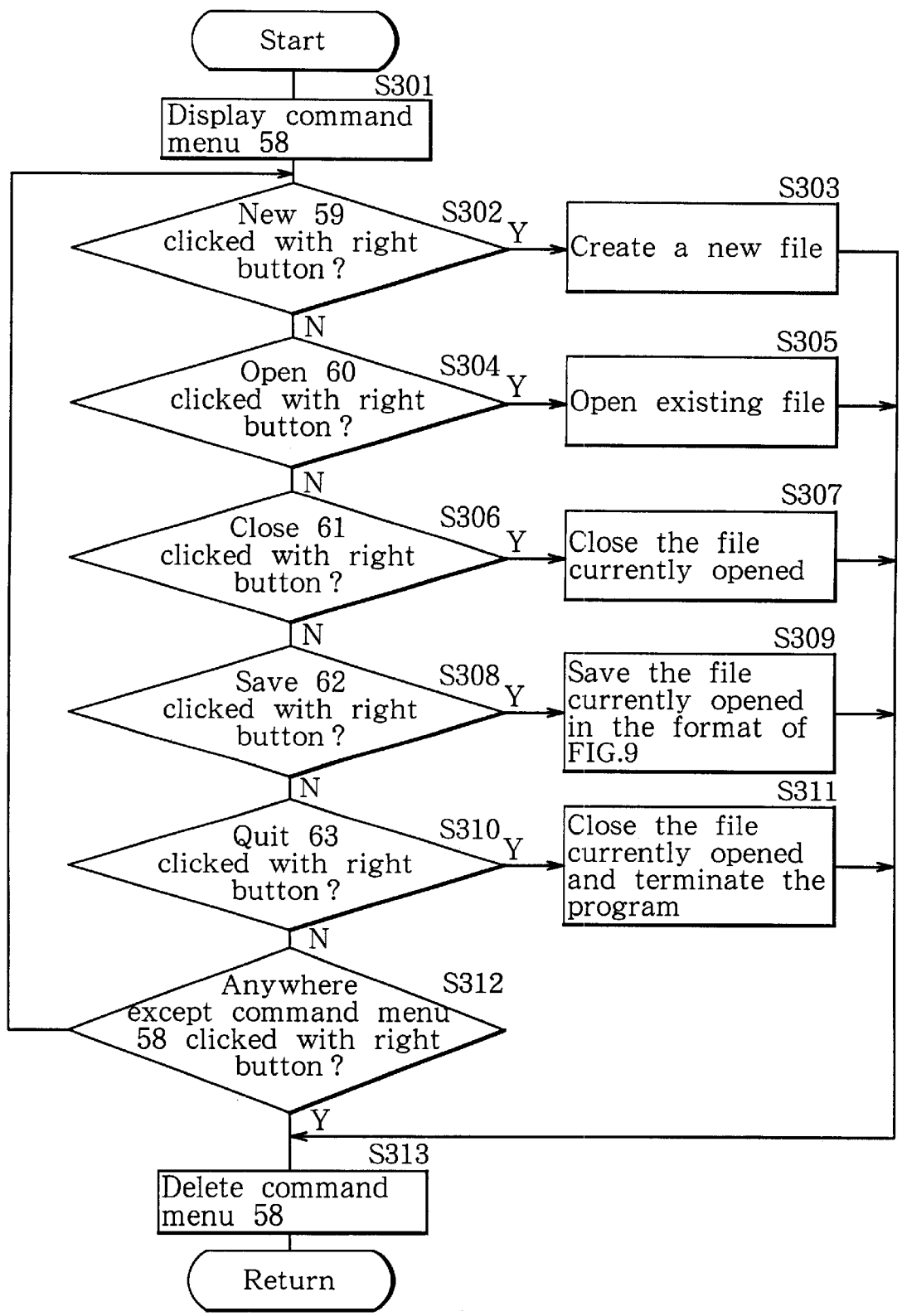
FIG. 13 is a flowchart of an example of file processing shown in FIG. 10.

Reference is now made to FIG. 10 to FIG. 13 for describing processing for generating the graphics command by the user through the GUI of the CG producing apparatus 3. FIG. 10 and FIG. 11 illustrate the content of processing of the GUI as a whole. FIG. 12 illustrates the content of the object processing of step S115 of FIG. 11. FIG. 13 illustrates the content of the file processing of step S120 of FIG. 11.

Referring to FIG. 10 and FIG. 11, the content of processing of the GUI as a whole will now be described. If the straight line item 55 of the tool menu 51 (FIG. 8) is clicked with the left button (Y of step S101 of FIG. 10), the GUI selects the straight line item 55 (step S102). If the select item 52 is clicked with the left button (Y of step S103), the GUI selects the select item 52 (step S104). If the quadrangle item 56 is clicked with the left button (Y of step S105), the GUI selects the quadrangle item 56 (step S106). If the circle item 53 is clicked with the left button (Y of step S107), the GUI selects the circle item 53 (step S108). If the character item 57 is clicked with the left button (Y of step S109), the GUI selects the character item 57 (step S110). If the eraser item 54 is clicked with the left button (Y of step S111), the GUI selects the eraser item 54 (step S112). The GUI then returns to step S101 after each processing.

When any point other than the tool menu 51 is clicked with the left button (Y of step S113 of FIG. 11), whether the select item 52 is selected or not is determined. If the select item 52 is not selected (N of step S114), the GUI goes to object processing shown in FIG. 12 (step S115). Having completed the object processing, the GUI returns to step S101. If the select item 52 is selected (Y of step S114) when any point other than the tool menu 51 is clicked with the left button, whether the point is over any object is determined (step S116). If the point is over any object (Y of step S116), the GUI selects the object and returns to step S101. If the point is not over any object (N of step S116), the GUI releases selection of an object if there is any object selected (step S118) and returns to step S101. If there is no object selected, the GUI returns to step S101.

When any point on the screen is clicked with the right button of the mouse (Y of step S119), the GUI performs file processing shown in FIG. 13 (step S120) and then returns to step S101.

Reference is now made to FIG. 12 for describing the object processing of step S115 of FIG. 11. As described with reference to FIG. 11, if the select item 52 is not selected when any point other than the tool menu 51 is clicked with the left button, whether the item selected when the point is clicked with the left button is the eraser item 54 is determined (step S201 of FIG. 12). If the eraser item 54 is selected (Y of step S201), whether the point clicked with the left button is over any object is determined (step S202). If the point is over any object (Y of step S202), the GUI deletes the object and returns to step S101 of FIG. 10. If the point is not over any object (N of step S202), the GUI returns to step S101. If the eraser item 54 is not selected (N of step S201), the GUI goes to step S204.

The GUI determines whether the item selected when the point is clicked with the left button is the straight line item 55 (step S204). If the straight line item 55 is selected (Y of step S204), a straight line is drawn between the point clicked with the left button and the point to which the mouse is dragged (step S205) and the GUI returns to step S101 of FIG. 10. If the straight line item 55 is not selected (N of step S204), the GUI goes to step S206.

The GUI determines whether the item selected when the point is clicked with the left button is the quadrangle item 56 (step S206). If the quadrangle item 56 is selected (Y of step S206), a quadrangle is drawn whose diagonal line is between the point clicked with the left button and the point to which the mouse is dragged (step S207) and the GUI returns to step S101 of FIG. 10. If the quadrangle item 56 is not selected (N of step S206), the GUI goes to step S208.

The GUI determines whether the item selected when the point is clicked with the left button is the circle item 53 (step S208). If the circle item 53 is selected (Y of step S208), a circle is drawn whose diameter is the line segment between the point clicked with the left button and the point to which the mouse is dragged (step S209) and the GUI returns to step S101 of FIG. 10. If the circle item 53 is not selected (N of step S208), the GUI goes to step S210.

The GUI determines whether the item selected when the point is clicked with the left button is the character item 57 (step S210). If the character item 57 is selected (Y of step S210), an input through a keyboard (not shown) is received and a character string is drawn where the point clicked with the left button is the upper left end (step S211) and the GUI returns to step S101 of FIG. 10. If the character item 57 is not selected (N of step S210), the GUI returns to step S101.

Reference is now made to FIG. 13 for describing the file processing of step S120 of FIG. 11. When the right button of the mouse is clicked at any point on the screen (Y of step S119 of FIG. 11), the command menu 58 (FIG. 8) is displayed at the point (step S301 of FIG. 13). If the New item 59 is clicked with the right button (Y of step S302), the present frame is cleared and a new frame is created (step S303). If the Open item 60 is clicked with the right button (Y of step S304), the graphics command file stored in a disk device not shown is loaded and the CG image drawn up is displayed on the screen by executing the graphics command (step S305). If the Close item 61 is clicked with the right button (Y of step S306), the graphics command file of the CG image currently opened (displayed on the screen) is closed (step S307). If the Save item 62 is clicked with the right button (Y of step S308), the graphics command file currently opened is saved in the disk device in the format shown in FIG. 9 (step S309). If the Quit item 63 is clicked with the right button (Y of step S310), the graphics command file currently opened is closed and the GUI processing is terminated (step S311). If any point except the command menu 58 is clicked with the right button (Y of step S312), the command menu 58 is deleted (step S313).

Figure 14:
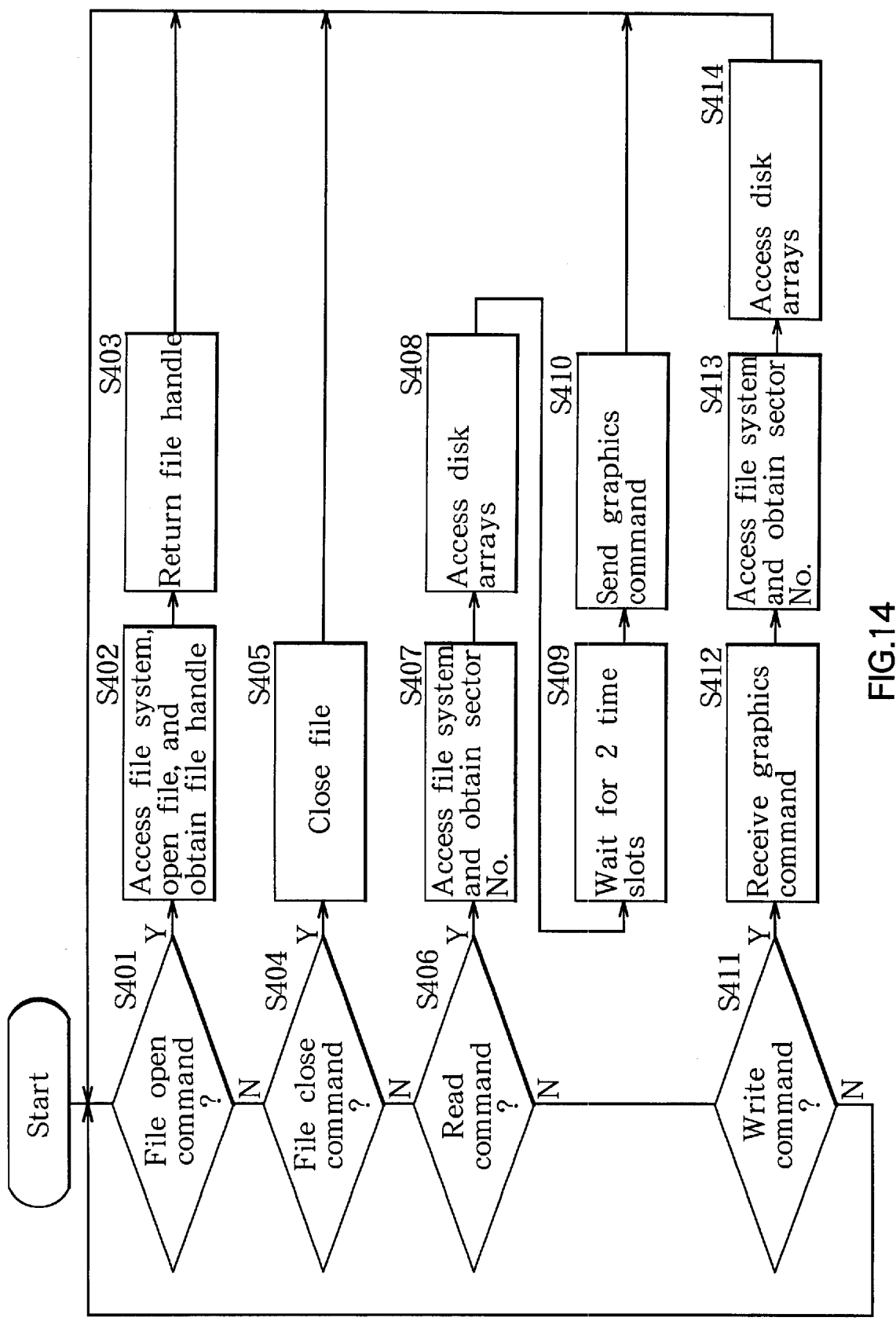
FIG. 14 is a flowchart of the main operation of the network interface shown in FIG. 3.
Figure 15:
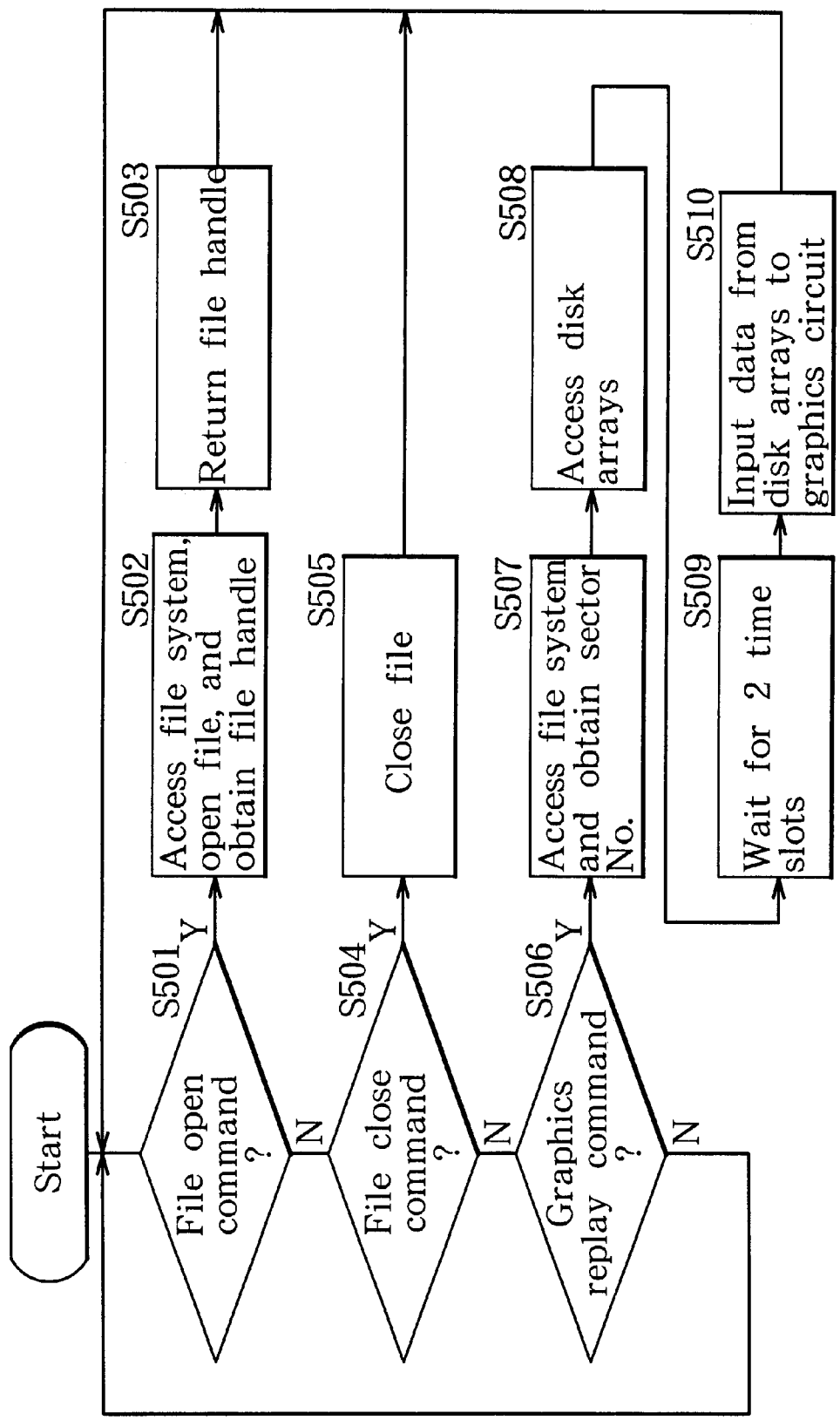
FIG. 15 is a flowchart of the main operation of the graphics processor shown in FIG. 4.
Figure 16:
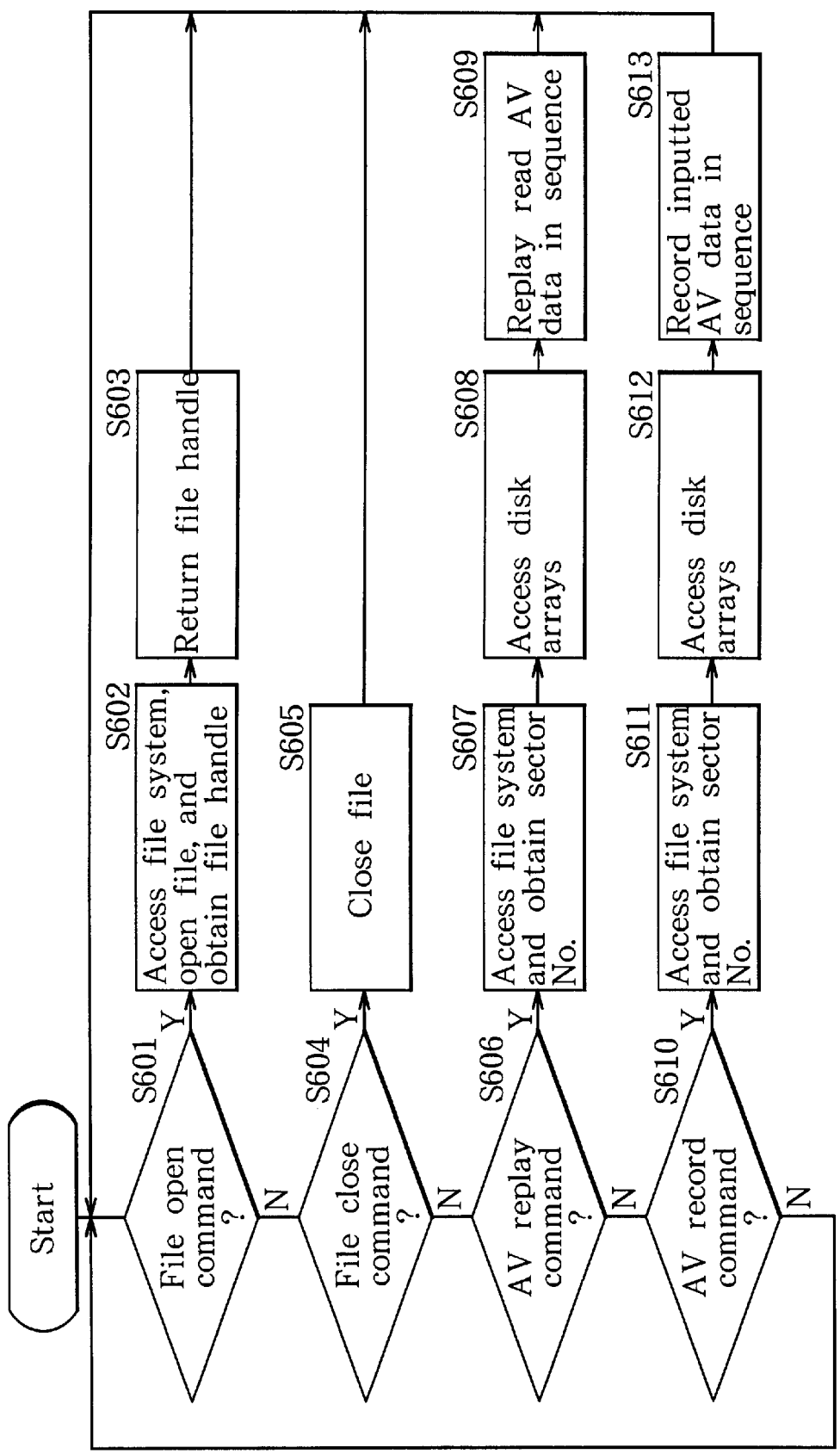
FIG. 16 is a flowchart of the main operation of the input/output processor shown in FIG. 6.

Referring to FIG. 14 to FIG. 16, the operation of the AV server 1 will now be described.

Reference is made to FIG. 14 for describing the operation of the AV server 1 for sending and receiving a graphics command between the CG producing apparatus 3 and the AV server 1. As described above, sending and receiving of a graphics command between the CG producing apparatus 3 and the AV server 1 is controlled by the NFS client program resident in the CG producing apparatus 3 and the NFS server program resident in the ROM 134 in the network interface 13 of the AV server 1. Accordingly, the users of the CG producing apparatus 3 are capable of performing file operation of the graphics command following the same steps as the steps of accessing their own disk device.

FIG. 14 shows processing mainly performed by the CPU 135 of the network interface 13 of the AV server 1 of sending and receiving processing of a graphics command between the CG producing apparatus 3 and the AV server 1 through the use of the NFS. If a command is sent from the CG producing apparatus 3 through the communication path 4, the CPU 135 receives and decodes the command and extracts the content of instruction of the command and the file name to access. If the command is a file open command for opening the graphics command files each stored in the disk arrays 2-1 to 2-4 (Y of step S401 of FIG. 14), the CPU 135 accesses the file system 14a of the main controller 14 through the communication bus 17, and obtains the file handles corresponding to the requested file names (step S402). The file open command is the command first required for accessing the files in the disk arrays 2-1 to 2-4 and for opening the files. The file handles are the numbers corresponding to the file names and may be each represented by data of about four bytes. The file handles are used instead of the file names since the files are opened until the files are closed.

The CPU 135 then returns the file handles obtained to the CG producing apparatus 3 through the communication path 4 (step S403) and returns to step S401.

If the command received is the file close command (Y of step S404), the CPU 135 abandons the file handles already obtained and close the files of the corresponding file names (step S405) and returns to step S401.

If the command received is the command for reading the graphics command file (Y of step S406), the CPU 135 accesses the file system 14a of the main controller 14 based on the file handles already obtained and obtains the file storage addresses (the sector numbers on the disks) in the disk arrays 2-1 to 2-4 (step S407). Based on the file storage addresses obtained, the CPU 135 accesses the disk arrays 2-1 to 2-4 with timing during the time slot allocated by the time slot signal 18 (step S408). To be specific, the CPU 135 outputs and supplies the graphics command read commands and the storage addresses to the disk arrays 2-1 to 2-4 through the buffer 136 and the descending data buses 15-1 to 15-4. The CPU 135 then waits for two time slots (step S409). Having received the graphic command data streams from the disk arrays 2-1 to 2-4 through the ascending data buses 16-1 to 16-4, the CPU 135 multiplexes the data streams to form the graphics command and sends the command to the CG producing apparatus 3 through the communication path 4 (step S410). The CPU 135 then returns to step S401. The CPU 135 waits for two time slots in step S409 since the period of time in which the controller (the CPU 25) of the disk arrays 2-1 to 2-4 (FIG. 7) accesses the HDD 21 is considered.

If the command received is the write command for writing the graphics command (Y of step S411), the CPU 135 receives the graphics command sent with the write command and preliminarily stores the command in the RAM 133 (step S412) and accesses the file system 14a of the main controller 14 based on the file handles already obtained and obtains the file destination addresses (the sector numbers on the disks) in the disk arrays 2-1 to 2-4 (step S413). Based on the file destination addresses obtained, the CPU 135 accesses the disk arrays 2-1 to 2-4 with timing during the time slot allocated by the time slot signal 18 (step S414). To be specific, the CPU 135 outputs and supplies the graphics command write commands, the graphics commands in the RAM 133 and the file destination addresses obtained to the disk arrays 2-1 to 2-4 through the buffer 136 and the descending data buses 15-1 to 15-4. The CPU 135 then returns to step S401. The graphics command data is thus written in the designated destination addresses in the disk arrays 2-1 to 2-4.

The operation of the AV server 1 for recording and replaying a moving image and replaying a CG image in response to a request from the CG producing apparatus 3 will now be described.

In FIG. 1 a request of the CG producing apparatus 3 for the AV server 1 to record and replay a moving image or replay a CG image is made as follows. The CG producing apparatus 3 logs in to the AV server system 10 through the communication path 4 in Telnet, sends the file open command, and then issues the AV record request command, the AV replay request command or the CG image replay request command. To be specific, for requesting to record a moving image (the AV input data 9), the CG producing apparatus 3 sends the file open command and the file names to open (the AV file names to record in the disk arrays 2-1 to 2-4) and the input/output port designation data and then the AV record request command to the AV server 1. The input/output port designation data indicates through which of the input/output ports (the input/output processors 11-1 to 11-n) of the AV server 1 the moving image is inputted and recorded. For requesting to replay a moving image (the AV output data 7), the CG producing apparatus 3 sends the file open command and the file names to open (the AV file names recorded in the disk arrays 2-1 to 2-4) and the input/output port data and then the AV replay request command to the AV server 1. For requesting to replay a CG image (the graphic image data 8), the CG producing apparatus 3 sends the file open command and the file names to open (the graphics command file names recorded in the disk arrays 2-1 to 2-4) and then the CG image replay request command to the AV server 1.

When the file open command is sent from the CG producing apparatus 3 that has logged in according to the Telnet protocol, the network interface 13 of the AV server 1 receives the command and generates a corresponding file open command as an internal control command. The network interface 13 sends the corresponding file open command together with the designated file name to the functional unit (the graphic processor 12 or any of the input/output processors 11-1 to 11-n) designated by the input/output port designation data. In this case, as described above, the file open command sent through the communication bus 17 conforms to the Telnet protocol as well. The same applies to the other internal control commands described below (the graphics replay command, the AV record command, and the AV replay command).

When the CG image replay request command is sent from the CG producing apparatus 3, the network interface 13 receives the command and generates a graphics replay command as a corresponding internal control command. The network interface 13 sends the graphics replay command to the graphics processor 12 through the communication bus 17.

When the AV record request command is sent from the CG producing apparatus 3, the network interface 13 receives the command and generates an AV record command as a corresponding internal control command. The network interface 13 sends the AV record command through the communication bus 17 to one of the input/output processors 11-1 to 11-n defined with the port designation data already received with the file open command.

When the AV replay request command is sent from the CG producing apparatus 3, the network interface 13 receives the command and generates an AV replay command as a corresponding internal control command. The network interface 13 sends the AV replay command through the communication bus 17 to one of the input/output processors 11-1 to 11-n defined with the port designation data already received with the file open command.

Reference is now made to FIG. 15 for describing the operation of the graphics processor 12, in response to the graphics replay command from the network interface 13, for replaying a CG image based on the graphics commands stored in the disk arrays 2-1 to 2-4 and outputting the image as the graphics image data 8. FIG. 15 shows processing mainly performed by the CPU 125 of the graphics processor 12.

When a command is sent from the network interface 13 through the communication bus 17, the CPU 125 of the graphics processor 12 receives and decodes the command and captures the content of instruction of the command and the file name requested. If the command is the file open command for opening the graphic command files each stored in the disk a rray s 2-1 to 2-4 (Y of step S501 of FIG. 15), the CPU 125 accesses the file system 14a of the main controller 14 through the communication bus 17, and obtains the file handles corresponding to the requested file names (step S502). The CPU 125 then returns the file handles obtained to the network interface 13 through the communication bus 17 (step S503) and returns to step S501. The network interface 13 sends the file handles received from the graphics processor 12 to the CG producing apparatus 3 through the communication path 4. The file handles are used instead of the file names until the files are closed.

If the command received is the file close command (Y of step S504), the CPU 125 abandons the file handles already obtained and close the files of the corresponding file names (step S505) and returns to step S501.

If the command received is the graphics replay command (Y of step S506), the CPU 125 performs a series of operation for reading the graphics command data from the disk arrays 2-1 to 2-4, multiplexing the data and inputting the data as the graphics command to the graphics circuit 121, and drawing CG image data at the graphics circuit 121. To be specific, the CPU 125 accesses the file system 14a of the main controller 14 based on the file handles already obtained by the file open command, and obtains the file storage addresses (the sector numbers on the disks) in the disk arrays 2-1 to 2-4 (step S507). Based on the file storage addresses obtained, the CPU 125 accesses the disk arrays 2-1 to 2-4 with timing during the time slot allocated by the time slot signal 18 (step S508). To be specific, the CPU 125 outputs and supplies the graphics command read commands and the file storage addresses to the disk arrays 2-1 to 2-4 through the buffer 126 and the descending data buses 15-1 to 15-4. The CPU 125 then waits for two time slots (step S509). Having received the graphics command data streams from the disk arrays 2-1 to 2-4 through the ascending dat a buses 16-1 to 16-4, the CPU 125 preliminarily stores the data streams in the buffer 127 and multiplexes the data streams in the buffer 127 to form the graphics command and inputs the command to the graphics circuit 121 (step S510). The CPU 125 then returns to step S501. The graphics circuit 121 performs graphics processing based on the inputted graphics command and outputs obtained CG image data as the graphics image output data 8. The series of operation is performed during the time slot period allocated by the time slot signal 18 supplied from the main controller 14.

Reference is now made to FIG. 16 for describing the operation of the input/output processors 11-1 to 11-n, in response to the AV record request command or the AV replay request command from the network interface 13, for recording or replaying AV data in the disk arrays 2-1 to 2-4. FIG. 16 shows processing mainly performed by the CPU 113 of the input/output processors 11-j (FIG. 6).

When a command is sent from the network interface 13 through the communication bus 17, the CPU 113 of the input/output processor 11-j receives and decodes the command and captures the content of instruction of the command and the file name requested. If the command is the file open command for opening the AV files each stored in the disk arrays 2-1 to 2-4 (Y of step S601 of FIG. 16), the CPU 113 accesses the file system 14a of the main controller 14 through the communication bus 17, and obtains the file handles corresponding to the requested file names (step S602). The CPU 113 then returns the file handles obtained to the network interface 13 through the communication bus 17 (step S603) and returns to step S601. The network interface 13 returns the file handles received from the input/output processor 11-j to the CG producing apparatus 3 through the communication path 4. The file handles are used instead of the file names until the files are closed.

If the command received is the file close command (Y of step S604), the CPU 113 abandons the file handles already obtained and close the files of the corresponding file names (step S605) and returns to step S601.

If the command received is the AV replay command (Y of step S606), the CPU 113 performs the operation of reading the data of the corresponding AV files from the disk arrays 2-1 to 2-4 in sequence and outputting the data as the AV output data 7-j. To be specific, the CPU 113 accesses the file system 14a of the main controller 14 based on the file handles already obtained by the file open command, and obtains the file storage addresses (the sector numbers on the disks) in the disk arrays 2-1 to 2-4 (step S607). Based on the file storage addresses obtained, the CPU 113 accesses the disk arrays 2-1 to 2-4 with timing during the time slot allocated by the time slot signal 18 (step S608). To be more specific, the CPU 113 supplies the AV data read commands and the file storage addresses to the disk arrays 2-1 to 2-4 through the descending data buses 15-1 to 15-4. Having received the AV data streams from the disk arrays 2-1 to 2-4 through the ascending data buses 16-1 to 16-4, the CPU 113 preliminarily stores the data streams in the buffer 1123 and multiplexes the four streams of AV data in the P-S converter 1122 to form serial image data for one frame and outputs the data as the AV output data 7-j through the output interface 1121 (step S609). The steps of the operation are each performed during the time slot period allocated by the time slot signal 18 supplied from the main controller 14. Replay of all the requested AV files having completed, the CPU 113 returns to step S601.

If the command received is the AV record command (Y of step S610), the CPU 113 performs a series of operation for recording the AV input data 9-j in the disk arrays 2-1 to 2-4.

To be specific, the CPU 113 accesses the file system 14a of the main controller 14 based on the file handles already obtained by the file open command, and obtains the file destination addresses (the sector numbers on the disks) in the disk arrays 2-1 to 2-4 (step S611). Based on the file destination addresses obtained, the CPU 113 accesses the disk arrays 2-1 to 2-4 with timing during the time slot allocated by the time slot signal 18 (step S612). To be specific, the CPU 113 supplies the AV data write commands and the file destination addresses to the disk arrays 2-1 to 2-4 through the descending data buses 15-1 to 15-4. The CPU 113 supplies streams of the AV input data 9-j supplied from an external source to the disk arrays 2-1 to 2-4 in sequence through the descending data buses 15-1 to 15-4 and records the data therein (step S613). To be more specific, the CPU 113 splits the serial AV input data 9-j for one frame inputted to the input interface 1111 into four streams of data in the S-P converter 1112 and preliminarily stores the data streams in the buffer 1113 and outputs the data from the bus interface 1114 to the disk arrays 2-1 to 2-4 through the descending data buses 15-1 to 15-4. The steps of the operation are each performed during the time slot period allocated by the time slot signal 18 supplied from the main controller 14. Recording of all the requested AV files having completed, the CPU 113 returns to step S601.

According to the AV server system 10 of the embodiment of the invention described so far, the AV server 1 that originally manipulates AV data as the first type of information provided in real time deals with the graphics command as the second type of information other than the first type as well. Furthermore, the AV server 1 records and replays the AV data and the graphics command, using the same disk arrays 2. As a result, a moving image and a still-frame image such as a CG image are manipulated in a unified manner. Consequently, for superimposing a CG image on a moving image, for example, processing of replaying and outputting the moving image and the CG image in synchronization with each other from the single AV server 1 is easily performed, compared to the related-art method of executing a graphics command to expand to CG image data and store in the CG producing apparatus and transferring the CG image data to the AV server to superimpose on the moving image. In addition, a load applied to the CG producing apparatus is reduced and the operation is simplified which is convenient for the user.

According to the AV record and replay system of the embodiment, the CG image produced by the CG producing apparatus 3 is transferred to the AV server 1 in the form of the graphics command. As a result, the data transfer amount is reduced and the time required for sending the CG image from the CG producing apparatus 3 to the AV server 1 is substantially reduced. The processing speed of the system as a whole is thus increased. In addition, the CG producing apparatus 3 does not require a large-capacity storage for retaining drawn CG image data that is required by the relatedart system. Furthermore, the AV server 1 stores the received graphics command in the disk arrays 2 as it is without expanding to CG image data. As a result, only a small portion of the storage space of the disk arrays 2 is occupied by the graphics commands and the AV data storage capacity of the disk arrays 2 is not affected.

Another embodiment of the invention will now be described.

Figure 17:
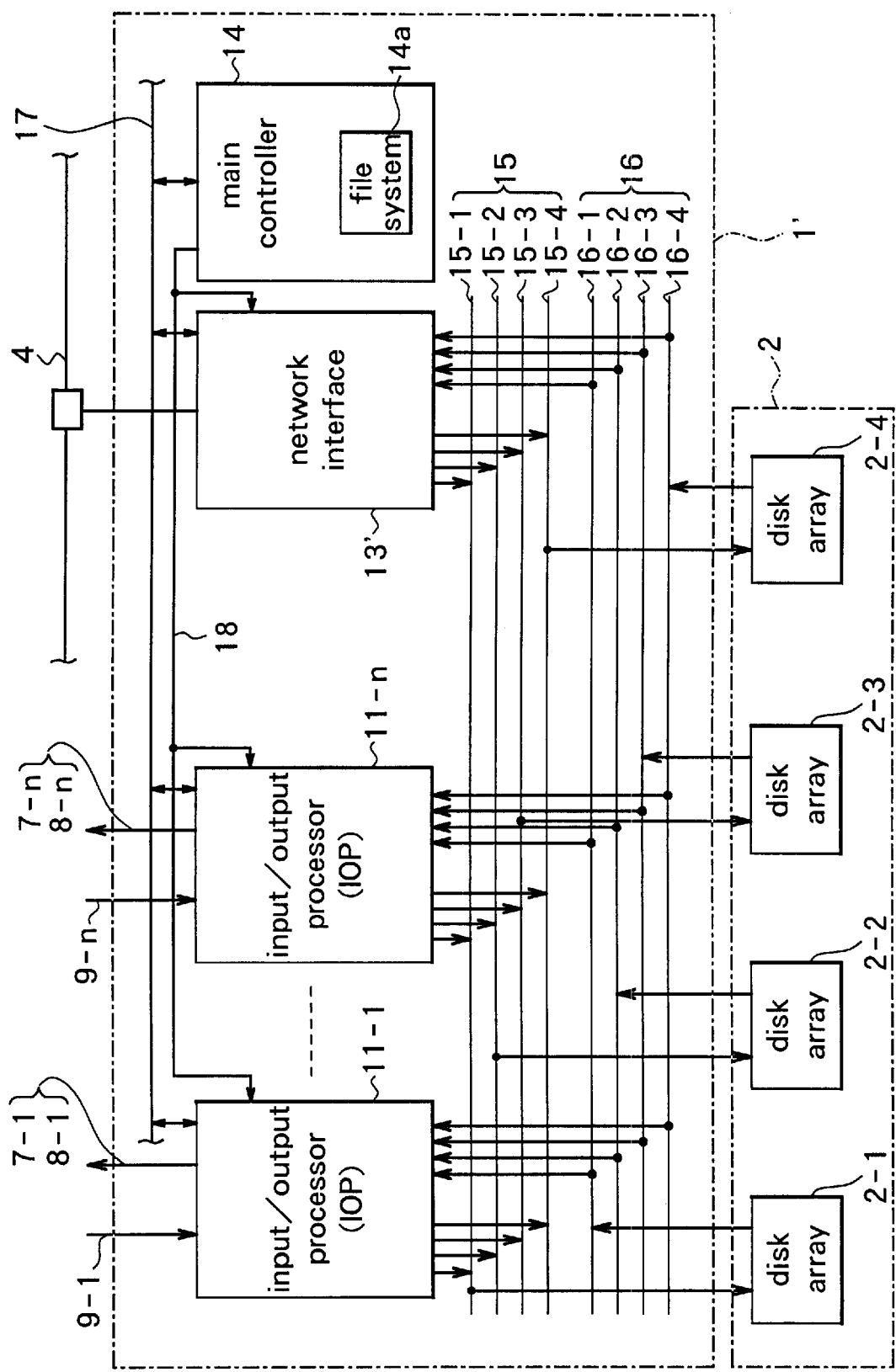
FIG. 17 is a block diagram of an AV server as an information recording and replaying apparatus of another embodiment of the invention.
Figure 18:
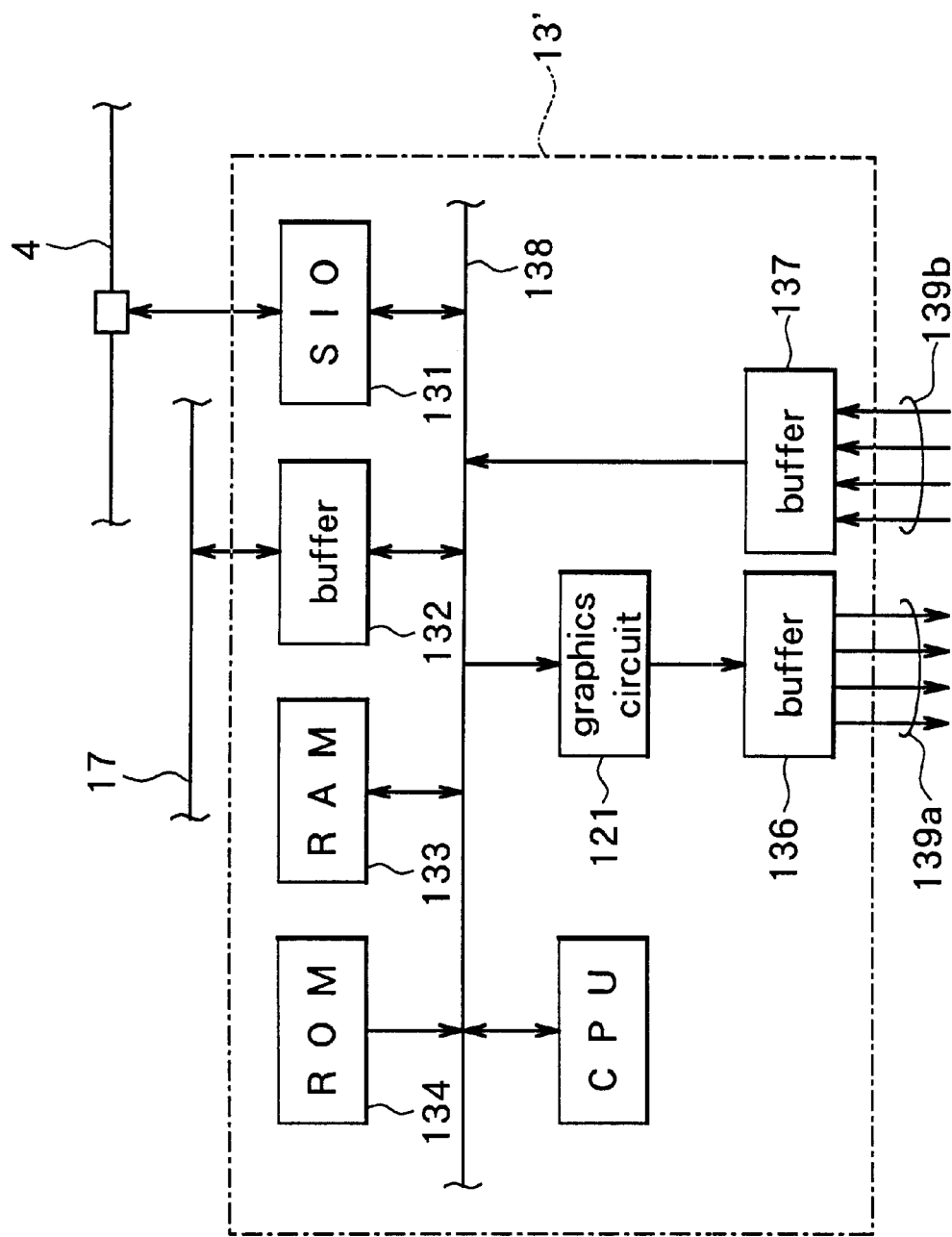
FIG. 18 is a block diagram illustrating the main part of the network interface of the AV server shown in FIG. 17.

FIG. 17 is a schematic view of an AV server as an information recording and replaying apparatus of another embodiment of the invention used in an AV server system. The AV server 1' of the embodiment is similar to the AV server 1 (FIG. 2) of the foregoing embodiment except that the graphics processor 12 is not provided but the graphics circuit 121 is provided between the internal bus 138 and the buffer 136 for output in a network interface 13' as shown in FIG. 18. The graphics circuit 121 is the same as the one shown in FIG. 5. In FIG. 17 and FIG. 18 like numerals are assigned to components similar to those of the foregoing embodiment shown in FIG. 2 and FIG. 3 and descriptions thereof are omitted. The remainder of the system configuration and the internal configurations of the devices are similar to those of the foregoing embodiment.

In the AV server 1', when a request for writing a CG image is made from the CG producing apparatus 3, the network interface 13' inputs the received graphics command to the graphics circuit 121 and performs graphics processing, and sends CG image data outputted from the graphics circuit 121 to the disk arrays 2-1 to 2-4 to record. When a request for reading a CG image is made from the CG producing apparatus 3, the network interface 13' reads CG image data from the disk arrays 2-1 to 2-4 and sends out the data as it is to the CG producing apparatus 3.

In the AV server 1', when a request for replaying a CG image is made from the CG producing apparatus 3, the input/output processor 11-j reads the CG image from the disk arrays 2-1 to 2-4 following steps similar to those of reading AV data and outputs the image as the graphics image data 8-j.

The remainder of processing is similar to that of the foregoing embodiment and description thereof is omitted.

According to the AV server system 10 of the embodiment thus described, the graphics processor 12 is not required so that the configuration of the AV server 1' is simplified. Since the CG image is stored in the disk arrays 2 in the form of expanded CG image data, the CG image data may be read and outputted from the input/output processor 11-j that is not outputting the AV output data 7-j. That is, the graphics image data 8 is manipulated in a manner similar to the other AV output data 7-j. As a result, the superimposer 5 (FIG. 1) does not require an input port dedicated to the graphics image data 8 in the embodiment since the graphics image data 8 may be outputted through the input/output processor 11-j, in contrast to the foregoing embodiment wherein the superimposer 5 requires the input port dedicated to capturing the graphics image data 8.

The invention is not limited to the foregoing embodiments but may be practiced in still other ways. For example, although the AV server 1 or 1' and the disk arrays 2 are separately provided in the foregoing embodiments, the AV server and the disk arrays may be integrated with each other. Although the disk arrays 2-1 to 2-4 have the RAID configuration in the foregoing embodiments, the invention is not limited to such a configuration. Although the HDD 21 is used as recording and replaying means in the disk arrays 2-1 to 2-4, any other device using a recording medium that allows random access may be utilized, such as a magneto-optic disk device using a magneto-optic disk. Alternatively, a device made up of semiconductor memory such as DRAM or flash memory may be applied.

Although the CG image replay request, the AV record request and the AV replay request to the AV server 1 or 1' are made from the CG producing apparatus 3 in the foregoing embodiments, those requests may be made from any other terminal not shown connected to the communication path 4.

Although the multi-channel video server used for AV data recording and replaying in a broadcast station, for example, is assumed in the foregoing embodiments, the invention may be applied to other kinds of data recording and replaying.

Although the second type of information is the graphic command in the foregoing embodiments, the second type of information may be any other information other than real-time information and may be other kinds of commands and typical text data. For example, the second type of information may be a command for controlling a device called switcher for switching a plurality of images, a command for producing a specific sound effect, and a command for controlling the brightness and contrast and so on of a displayed image. In such cases, the content of a moving image and the control command may be appropriately synchronized with each other so as to achieve an interesting effect that has never been achieved with related-art techniques. To achieve this, the hardware suitable for implementing each command such as a circuit board for directly executing each command may be provided.

According to the information recording and replaying apparatus and the method of controlling the same of the invention, not only the first type of information provided in real time but also the second type of information other than the first type of information is recorded in the same storage means or replayed from the same storage means. As a result, the two different types of information are manipulated in a unified manner and the apparatus configuration and processing are simplified.

According to the information recording and replaying apparatus of the invention, the second information recording and replaying means may be capable of performing input and output of information in a form suitable for the second type of information. As a result, the invention is applicable to various types of information besides the first type of information provided in real time.

According to the information recording and replaying apparatus of the invention, the second type of information may be a graphic command. As a result, the information recording and replaying apparatus that originally deals with audio and moving images as the first type of information is capable of manipulating the graphic command as well in a unified manner.

According to the information recording and replaying apparatus of the invention, the second information recording and replaying means may include at least one graphic means capable of drawing an image based on the graphic command. As a result, for superimposing a CG image and the like on a moving image, for example, the apparatus of the invention no more requires processing performed in the related-art method of drawing a CG image in another apparatus in advance and transferring the large amount of data to the information recording and replaying apparatus. The operation is thereby simplified and the processing speed is increased.

According to the information recording and replaying apparatus of the invention, the graphic command whose data amount is small is stored in the storage means and graphic processing is performed by the graphic means based on the graphic command read from the storage means. As a result, the graphic command occupies only a minute portion of the storage space of the storage means and the storage capacity of the storage means is not affected.

Obviously many modifications and variations of the present invention are possible in the light of the above teachings. It is therefore to be understood that within the scope of the appended claims the invention may be practiced otherwise than as specifically described.

What is claimed is:

1. An information recording and replaying apparatus comprising:

a first information recording and replaying means for selectively recording audio-video moving image information provided in real time on a storage means and/or replaying said audio-video moving image information from the storage means; and a second information recording and replaying means for selectively recording still-frame computer graphics information on the storage means and/or replaying the still-frame computer graphics information from the storage means, said still-frame computer graphics information representing a number of objects to be superimposed on said audio-video moving image information;

whereby the still-frame computer graphics information is transmitted from an external source to the second information recording and replaying means in an abbreviated format, thereby minimizing the time required to transmit said still-frame computer graphics information from said external source and conserving storage capacity of said storage means, and whereby the still-frame computer graphics information in said abbreviated format includes at least one or more pointers indicating positions of said number of objects and parameters relating thereto so as to define each of said number of objects without having to provide dot-by-dot image data representative of each dot of a respective frame.

2. An information recording and replaying apparatus according to claim 1 wherein the second information recording and replaying means is capable of performing input and output of information in a form suitable for the still-frame computer graphics information.

3. An information recording and replaying apparatus according to claim 1 wherein the second type of information is a graphics command for drawing an image.

4. An information recording and replaying apparatus according to claim 1 wherein the second information recording and replaying means includes at least one graphics means capable of drawing an image based on a graphics command for drawing an image.

5. An information recording and replaying apparatus according to claim 4 wherein the second information recording and replaying means records the graphics command as it is in the storage means, performs graphics processing by the graphics means based on the graphics command read from the storage means, and outputs graphics image data generated by the graphics processing.

6. An information recording and replaying apparatus according to claim 4 wherein:

the second information recording and replaying means performs graphics processing by the graphics means based on the graphics command and records graphics image data thereby obtained in the storage means; and the first information recording and replaying means reads the graphics image data from the storage means and outputs the data.

7. A method of controlling an information recording and replaying apparatus for recording information on a storage means and replaying information from the storage means, including the steps of:

selectively recording audio-video moving image information provided in real time on the storage means and/or replaying said audio-video moving image information from the storage means; and selectively recording still-frame computer graphics information on the storage means and/or replaying the still-frame computer graphics information from the storage means, said still-frame computer graphics information representing a number of objects to be superimposed on said audio-video moving image information;

whereby an external source transmits the still-frame computer graphics information in an abbreviated format to the apparatus, thereby minimizing the time required to transmit said still-frame computer graphics information from said external source and conserving storage capacity of said storage means, and whereby the still-frame computer graphics information in said abbreviated format includes at least one or more pointers indicating positions of said number of objects and parameters relating thereto so as to define each of said number of objects without having to provide dot-by-dot image data representative of each dot of a respective frame.

8. An information recording and replaying apparatus comprising:

a recording and replaying means for selectively recording video and/or audio data (AV data) on a recording medium to which nonlinear access is allowed and/or replaying the data recorded on the medium;

a plurality of input/output processing means for processing the data inputted from an AV source and supplying the processed data to the recording and replaying means, and for processing the data outputted from the recording and replaying means and outputting the processed data to outside the apparatus; and a graphics processing means for receiving still-frame computer graphics data for indicating a type of an image to be superimposed on the video data and supplying the indicating data to the recording and replaying means and for outputting graphics data based on the indicating data outputted from the recording and replaying means, said indicating data representing a number of objects to be superimposed on said video data;

whereby said indicating data is transmitted from an external source to said plurality of input/output processing means in an abbreviated format, thereby minimizing the time required to transmit said indicating data from said external source, whereby the indicating data in said abbreviated format includes at least one or more pointers indicating positions of said number of objects and parameters relating thereto so as to define each of said number of objects without having to provide dot-by-dot image data representative of each dot of a respective frame;

and wherein time slots are each allocated to the input/output processing means and the graphics processing means, respectively, and the input/output processing means and the graphics processing means each perform the processing within the allocated time slots.

9. An information recording and replaying apparatus according to claim 8, the recording medium having the configuration of redundant array of inexpensive disks (RAID) wherein a plurality of hard disk drives are arranged in parallel.

10. An information recording and replaying apparatus according to claim 8 wherein the graphics processing means includes a conversion means for converting the indicating data outputted from the recording and replaying means into data of two-dimensional coordinates and outputting the converted data; and a graphics generating means for generating graphics data to be superimposed on the video data from the data of two-dimensional coordinates outputted from the conversion means and outputting the graphics data.

11. An information recording and replaying apparatus according to claim 8 wherein the video data outputted from the input/output processing means and the graphics data outputted from the graphics processing means are outputted to a superimposer connected to outside the apparatus and the graphics data is superimposed on the video data.

12. An information recording and replaying method, using an information recording and replaying means for selectively recording video and/or audio data (AV data) on a recording medium to which nonlinear access is allowed and/or replaying the data recorded on the medium, including:

a first step of supplying the data inputted from an AV source to the recording and replaying means within an allocated time slot;

a second step of outputting the data from the information recording and replaying means to outside the apparatus within the time slot;

a third step of receiving still-frame computer graphics data for indicating a type of an image to be superimposed on the video data and supplying the indicating data to the recording and replaying means within an allocated time slot, said indicating data representing a number of objects to be superimposed on said video data;

whereby said indicating data is transmitted from an external source to the recording and replaying means in an abbreviated format, thereby minimizing the time required to transmit said indicating data from said external source, whereby the indicating data in said abbreviated format includes at least one or more pointers indicating positions of said number of objects and parameters relating thereto so as to define each of said number of objects without having to provide dot-by-dot image data representative of each dot of a respective frame; and a fourth step of outputting the indicating data from the recording and replying means within the time slot, generating graphics data from the indicating data and outputting the graphics data.

13. An information recording and replaying method according to claim 12, the recording medium having the configuration of redundant array of inexpensive disks (RAID) wherein a plurality of hard disk drives are arranged in parallel.

14. An information recording and replaying method according to claim 12, the fourth step including the steps of converting the indicating data outputted from the recording and replaying means into data of two-dimensional coordinates and outputting the converted data;

and generating graphics data to be superimposed on the video data from the data of two-dimensional coordinates converted in the step of converting and outputting the graphics data.

* * * * *